US009405012B2

(12) United States Patent
Doucet et al.

(10) Patent No.: US 9,405,012 B2
(45) Date of Patent: Aug. 2, 2016

(54) ADVANCED GLOBAL NAVIGATION SATELLITE SYSTEMS (GNSS) POSITIONING USING PRECISE SATELLITE INFORMATION

(71) Applicant: Trimble Navigation Limited, Sunnyvale, CA (US)

(72) Inventors: Kenneth Donald Doucet, Hoehenkirchen-Siegertsbrunn (DE); Herbert Landau, Hoehenkirchen-Siegertsbrunn (DE)

(73) Assignee: Trimble Navigation Limited, Sunnyvale, CA (US)

( * ) Notice: Subject to any disclaimer, the term of this patent is extended or adjusted under 35 U.S.C. 154(b) by 462 days.

(21) Appl. No.: 13/793,664

(22) Filed: Mar. 11, 2013

(65) Prior Publication Data
US 2013/0271318 A1 Oct. 17, 2013

Related U.S. Application Data

(60) Provisional application No. 61/623,300, filed on Apr. 12, 2012, provisional application No. 61/623,869, filed on Apr. 13, 2012.

(51) Int. Cl.
*G01S 19/25* (2010.01)
*G01S 19/20* (2010.01)
(Continued)

(52) U.S. Cl.
CPC .............. *G01S 19/25* (2013.01); *G01S 19/20* (2013.01); *G01S 19/22* (2013.01); *G01S 19/44* (2013.01)

(58) Field of Classification Search
CPC ......... G01S 19/25; G01S 19/20; G01S 19/22; G01S 19/44
USPC .................................................... 342/357.64
See application file for complete search history.

(56) References Cited

U.S. PATENT DOCUMENTS 5,828,336 A * 10/1998 Yunck et al. ............. 342/357.31
2009/0099774 A1    4/2009 Takac et al.
2013/0044026 A1 * 2/2013 Chen et al. ............... 342/357.27

FOREIGN PATENT DOCUMENTS

WO    2011/034614 A2    3/2011
WO    2011/034615 A2    3/2011
(Continued)

OTHER PUBLICATIONS

Takac et al., "SmartRTK: A Novel Method of Processing Standardised RTCM Network RTK Information for High Precision Positioning", (Apr. 2008) downloaded from http://www.leica-downloads123/zz/general/gps1200/tech_paper/SmartRTK 11 pages.
(Continued)

*Primary Examiner* — Harry Liu
(74) *Attorney, Agent, or Firm* — Kilpatrick Townsend & Stockton LLP

(57) ABSTRACT

A method is provided for estimating parameters useful to determine the position of a global navigation satellite system (GNSS) receiver or a change in the position thereof. The method includes the steps of: obtaining at least one GNSS signal received at the GNSS receiver from each of a plurality of GNSS satellites; obtaining, from at least one network node, precise satellite information on: (i) the orbit or position of at least one of the plurality of GNSS satellites, and (ii) a clock offset of at least one of the plurality of GNSS satellites; identifying, among the obtained GNSS signals, a subset of at least one GNSS signal possibly affected by a cycle slip, the identified subset being hereinafter referred to as cycle-slip affected subset; and estimating parameters useful to determine the position of the GNSS receiver or a change in the position of the GNSS receiver using at least some of the obtained GNSS signals which are not in the cycle-slip affected subset, and the precise satellite information.

34 Claims, 30 Drawing Sheets

(51) Int. Cl.
*G01S 19/22* (2010.01)
*G01S 19/44* (2010.01)

(56) References Cited

FOREIGN PATENT DOCUMENTS

| WO | 2011/034616 A2 | 3/2011 |
|---|---|---|
| WO | 2011/034617 A2 | 3/2011 |
| WO | 2011/034624 A2 | 3/2011 |

OTHER PUBLICATIONS

Lee, Y.C. (1992), Receiver autonomous integrity monitoring (RAIM) capability for sole-means GPS navigation in the oceanic phase of flight, Position Location and Navigation Symposium, pp. 464-472.
Hewitson, S., Lee, H. K., and Wang, J. (2004), Localization Analysis for GPS/Galileo Receiver Autonomous Integrity Monitoring, Journal of Navigation, 57, pp. 245-259.
Hewitson, S. and Wang, J. (2007), GNSS Receiver Autonomous Integrity Monitoring with a Dynamic Model, Journal of Navigation, 60 pp. 247-263).
Springer, T.A. and Hugentobler, U., IGS ultra rapid products for (near-) real-time applications, Physics and Chemistry of the Earth, Part A: Solid Earth and Geodesy, vol. 26, Issues 6-8, pp. 623-628.
Niell, A. E., Global mapping functions for the atmosphere delay at radio wavelengths, Journal of Geophysical Research, 1996, pp. 3227-3246.
Peyton, D. R. (1990). An investigation into acceleration determination for airborne gravimetry using the global positioning system. University of New Brunswick. Frederiction: University of New Brunswick, 154 pages.
Hesselbarth, A., & Wanninger, L., Short-term stability of GNSS satellite clocks and its effects on precise point positioning, Dresden University of Technology, Geodetic Institute, Dresden, Germany: Dresden University of Technology, 2008, pp. 1855-1863.
Wanninger, L. a., Carrier phase multipath calibration of GPS reference stations, Salt Lake City: Institute of Navigation, 2000, 13 pages.
IGS Products, 2009, retrieved May 28, 2013, from International GNSS Service: http://igscb.ipl.nasa.gov/components/prods.html 4 pages.
Wanninger, L., & Wallstab-Freitag, S., Combined processing of GPS, GLONASS and SBAS code phase and carrier phase measurements, Institude of Navigation, Fort Worth, Texas: Proceedings ION GNSS 2007, pp. 866-875.
Baarda, W. (1968) "A testing procedure for use in geodetic network", Publications on Geodesy (vol. 2 Nr.5), 97 pages.
Leppakoski, H, Kuueniemi, H, and Takala, J, 2006, "RAIM and complementary Kalman filtering for GNSS Realiability Enhancement", Tampere University of Technology, Finland, 19 pages.
Melbourne-Wubbena (Melbourne, W. (1985). The case for ranging in GPS based geodetic systems. Proceedings of 1st International Symposium on Precise Positioning with the Global Positioning System. Rockville, Maryland: U.S. Department of Commerc, 15 pages.
Teunissen, P. J. J. (1994), "A new method for fast carrier phase ambiguity estimation", Proceeding of IEEE Plans'94, Las Vegas, NV, Apr. 11-15, pp. 562-573.

* cited by examiner

Fig. 1: Single differenced (time) L1-C/A carrier phase GPS-32

Fig. 2 Double differenced (Time/SV) L1-C/A carrier phase GPS-16 and GPS-32

Fig. 3 Single differenced (time) L1-C/A carrier phase GPS-25

Fig. 4 Single differenced (time) L2-P carrier phase GPS-25

Fig. 5 Single differenced (time) L1-C/A - L2-P carrier phase GPS-25

Fig. 6 Single difference (time) L1 C/A carrier phase GLONASS-07

Fig. 7 Single difference (time) L1 P carrier phase GLONASS-07

Fig. 8 Single difference (time) L2-P carrier phase GLONASS-07

Fig. 9 Single difference (time) L1-C/A – L1-P carrier phase GLONASS-07

Fig. 10 Single difference (time) L1-C/A - L2-P carrier phase GLONASS-07

Fig. 11 Single difference (time) L1-P - L2-P carrier phase GLONASS-07

Fig. 12 Double difference (time/SV) L1 C/A carrier phase GLONASS-07 and GLONASS-22

Fig. 13 Double difference (time/SV) L1 P carrier phase GLONASS-07 and GLONASS-22

Fig. 14 Double difference (time/SV) L2-P carrier phase GLONASS-07 and GLONASS-22

Fig. 15 Double difference (time/Station) L1-C/A carrier phase GLONASS-07

Fig. 16 Double difference (time/Station) L1-P carrier phase GLONASS-07

Fig. 17 Double difference (time/Station) L2-P carrier phase GLONASS-07

Fig. 18 NetR9 post-processed RTx kinematic solution ENU (east, north, up) errors from ionospheric free code Fig. 19 NetR9 post-processed RTx static float solution ENU (east, north, up) errors from ionospheric free carrier phase Fig. 20 NetR9 wide lane phase – narrow lane code GPS-11

Fig. 21 NetR9 wide lane phase – narrow lane code GLONASS-01

ADVANCED GLOBAL NAVIGATION
SATELLITE SYSTEMS (GNSS) POSITIONING
USING PRECISE SATELLITE INFORMATION

CROSS-REFERENCE TO RELATED
APPLICATIONS

This application claims priority to U.S. Provisional Patent Application Nos. 61/623,300, filed Apr. 12, 2012 and 61/623,869, filed Apr. 13, 2012, the entire contents of which are hereby incorporated by reference in their entirety for all purposes.

FIELD OF TECHNOLOGY

The invention relates to global navigation satellite systems (GNSS) position estimation methods and apparatuses. The fields of application of the methods and apparatuses include, but are not limited to, navigation, map-making, land surveying, civil engineering, agriculture, disaster prevention and relief, and scientific research.

BACKGROUND

1. Introduction

Global navigation satellite systems (GNSS) include Global Positioning System (GPS) (United States), GLONASS (Russia), Galileo (Europe), and COMPASS (China) (systems in use or in development). A GNSS typically uses a plurality of satellites orbiting the earth. The plurality of satellites forms a constellation of satellites. A GNSS receiver detects a pseudo-random noise (PRN) code modulated on an electromagnetic signal broadcasted by a satellite. The code is also called a ranging code. Code detection includes comparing the bit sequence modulated on the broadcasted signal with a receiver generated replica of the code to be detected. Based on the detection of the time of arrival of the code for each of a series of the satellites, the GNSS receiver estimates its position. Positioning includes, but is not limited to, geolocation, i.e. the positioning on the surface of the Earth.

An overview of GPS, GLONASS and Galileo is provided for instance in chapters 9, 10 and 11 respectively of Hofmann-Wellenhof B., et al., *GNSS, Global Navigation Satellite Systems, GPS, GLONASS, Galileo, & more*, Springer-Verlag Wien, 2008, (hereinafter referred to as "reference [1]"), which is herewith incorporated by reference in its entirety.

Positioning using GNSS signal codes provides a limited accuracy, notably due to the resolution of the code determined by its bit rate (or chip rate). For instance, the GPS includes the transmission of a coarse/acquisition (C/A) code with a 1.023 MHz chip rate at a carrier frequency of 1575.45 MHz, the so-called L1 frequency. This code is freely available to the public, in comparison to the Precise (P) code with a 10.23 MHz chip rate, which is reserved for military applications. The accuracy of code-based positioning using the GPS C/A code is approximately 15 meters, when taking into account both the electronic uncertainty associated with the detection of the C/A code (electronic detection of the time of arrival of the pseudorandom code) and other errors including those caused by ionospheric and tropospheric effects, ephemeris errors, satellite clock errors and multipath propagation.

An alternative to positioning based on the detection of a PRN code is positioning based on carrier phase measurements. In this alternative approach or additional approach (ranging codes and carrier phases can be used together for positioning), the carrier phase of the GNSS signal transmitted from the GNSS satellite is detected, not (or not only) the code modulated on the signal transmitted from the satellite.

The approach based on carrier phase measurements has the potential to provide a much greater position precision, i.e. up to centimetre-level or even millimetre-level precision, compared to the code-based approach. The reason may be intuitively understood as follows. The code, such as the GPS C/A code on the L1 band, has a chip length (300 meters for the C/A-code) that is much longer than one cycle of the carrier onto which the code is modulated (19 centimeters for the L1 band). The position resolution may therefore be viewed as greater for carrier phase detection than for code detection.

However, in the process of estimating the position based on carrier phase measurements, the carrier phases are ambiguous by an unknown number of cycles. The phase of a received signal can be determined, but the integer cycles cannot be directly determined in an unambiguous manner. This is the so-called "integer ambiguity problem", "integer ambiguity resolution problem" or "phase ambiguity resolution problem".

GNSS observation equations for code observations and for carrier phase observations are for instance provided in reference [1], section 5. An introduction to the GNSS integer ambiguity resolution problem is provided in reference [1], section 7.2.

2. Problem to be Solved

There is a need for improving the implementation of positioning systems based on GNSS carrier phase measurements, to obtain a precise estimation of the receiver position in a quick, stable and computationally efficient manner.

SUMMARY

The present invention aims at meeting the above-mentioned needs. In particular, the invention aims at improving the implementation of the methods of the prior art keeping in mind the goals of obtaining rapidly a stable and more precise solution.

The invention includes methods and apparatuses as defined in the claims.

In one embodiment of the invention, a method is provided for estimating parameters useful to determine the position of a global navigation satellite system (GNSS) receiver or a change in the position of the GNSS receiver. The method includes the steps of: (a) obtaining at least one GNSS signal received at the GNSS receiver from each of a plurality of GNSS satellites; (b) obtaining, from at least one network node, information, here referred to as "precise satellite information", on: (b.i) the orbit or position of at least one of the plurality of GNSS satellites, and (b.ii) a clock offset of at least one of the plurality of GNSS satellites; (c) identifying, among the obtained GNSS signals, a subset of at least one GNSS signal possibly affected by a cycle slip, the identified subset being hereinafter referred to as "cycle-slip affected subset"; and (d) estimating parameters useful to determine the position of the GNSS receiver or a change in the position of the GNSS receiver using: (d.i) at least some of the obtained GNSS signals which do not belong to the cycle-slip affected subset, and (d.ii) the precise satellite information.

Omitting the signals possibly affected by a cycle slip, comprising the signals that have been actually affected by a cycle slip and those that have been possibly affected by a cycle slip (whereas, in fact, they may have been affected by an anomalous satellite clock), for the purpose of computing the receiver position using the reference information on the satellite position and satellite clock offset (precise satellite information), enables to efficiently and precisely estimate parameters useful to determine the position of the GNSS receiver. This is because, by omitting the signals possibly affected by a cycle slip, the computation is neither affected by observations corrupted by cycle-slip affected signals nor by observations corrupted by a transient satellite clock anomaly, wherein the source of none of these corruptions affecting the observations are accounted for in the precise information.

BRIEF DESCRIPTION OF THE DRAWINGS

Embodiments of the present invention shall now be described, in conjunction with the appended drawings in which.

DETAILED DESCRIPTION

The present invention shall now be described in conjunction with specific embodiments. The specific embodiments serve to provide the skilled person with a better understanding, but are not intended to in any way restrict the scope of the invention, which is defined by appended claims. In particular, the embodiments described independently throughout the description can be combined to form further embodiments to the extent that they are not mutually exclusive.

Figure 24:
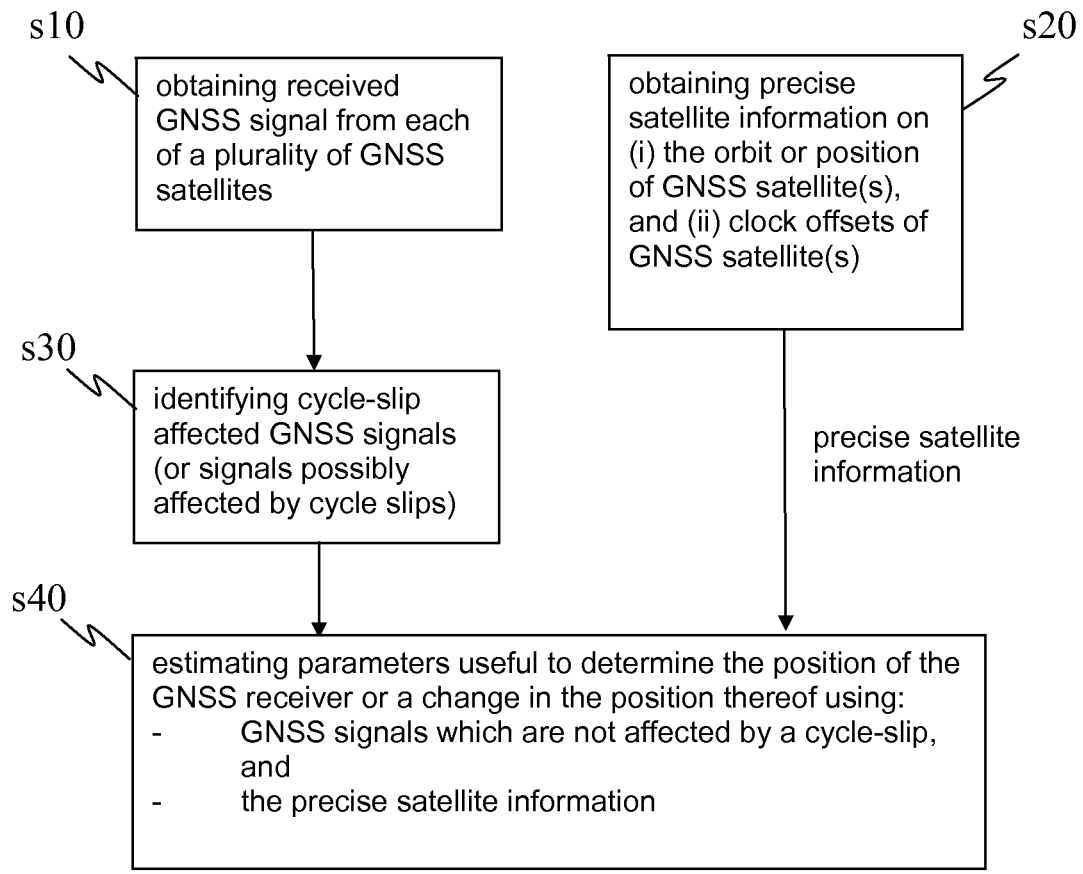
FIG. 24 is a flowchart of a method in one embodiment of the invention.

The flowchart of FIG. 24 illustrates a method in one embodiment of the invention. The method serves to estimate parameters which are derived at least from global navigational satellite system (GNSS) signals and which are useful to determine a position, such as the position of a stationary or moving GNSS receiver or, more precisely, the antenna connected to the GNSS receiver. The method may eventually lead to determining or estimating the stationary or moving antenna position hereafter referred to as the rover position for the rover receiver The method includes the following steps:

First, in step s10, at least one GNSS signal received from each of a plurality of GNSS satellites at the GNSS receiver (of which the position or the change in position is to be determined) is obtained. Either the receiver obtains the at least one GNSS signal received at the GNSS receiver itself (if the receiver is itself in charge of carrying out the method), or a server obtains the at least one GNSS signal received at the GNSS receiver (if the server is in charge of carrying out the method, rather than the receiver). The receiver, such as a rover receiver, may receive at least one GNSS signal from each of a plurality of GNSS satellites by observing the ranging codes carried on a particular frequency (carrier) from each of the plurality of GNSS satellites, or by observing the phase of the carrier emitted on a particular frequency (carrier) from each of the plurality of GNSS satellites, or by observing both the ranging codes and the carrier phases.

Secondly, in step s20, information is obtained from at least one network node, this information being here referred to as "precise satellite information". The obtained precise satellite information comprises information on (i) the orbit or position of at least one of the plurality of GNSS satellites and on (ii) a clock offset of at least one of the plurality of GNSS satellite. The precise satellite information may be obtained from a network of reference receivers, as described for instance in international application WO 2011/034624 A2, WO 2011/034615 A2, WO 2011/034616 A2, WO 2011/034617 A2, and WO 2011/034614 A2.

Then, in step s30, the GNSS signals (among those received) which are affected by a cycle slip, or possibly affected by a cycle slip, are identified. One way to detect cycle slips is through the scheme of differences as explained for instance in reference [1], section 7.1.2, with reference to table 7.1 on page 198 and the accompanying description. The description leading to equation (8) below will also provide a foundation explaining how a cycle slip can be detected.

Next, the parameters useful to determine the position of the GNSS receiver or a change in the position thereof are estimated in step s40. This process of estimating these parameters makes use of at least some of the obtained GNSS signals which are not in the cycle-slip affected subset (comprising the signals that have been actually affected by a cycle slip and those that have been possibly affected by a cycle slip, although they may have been affected by an anomalous satellite clock) and makes also use of the precise satellite information.

In other words, based on the outcome of processing steps s20 and s30, parameters are estimated s40, which are useful to determine or estimate a position, such as the position of a rover or more specifically the position of the antenna thereof. For instance, the estimated parameters may indicate the most probable number of cycles for the carrier wave between the GNSS receiver and GNSS satellite, i.e. the estimated parameters may be the resolved integer ambiguity. In other words, the output of the method is not necessarily the position itself but parameters that may be used, for instance by another entity (such as a processing entity on a server dedicated to such task), to estimate or determine the rover position.

As mentioned above, the method may be performed by the rover receiver itself or by another processing entity remotely located from the rover receiver. The rover receiver may be static (not moving) or dynamic (moving). The rover receiver may send data representing the GNSS observations to the processing entity which is then in charge of obtaining (step s10) the GNSS observations and performing the other steps of the method (steps s20, s30, and s40).

The precise satellite information may be computed or prepared by a network of reference receivers for which positions are precisely known and then the precise satellite information may be transmitted using for instance NTRIP (Networked transport of RTCM via Internet protocol, wherein RTCM stands for Radio Technical Commission for Maritime (Services)), or via satellite link, for example on L1-band which allows the same antenna to be used that receives the GNSS signals.

The location of a reference receiver, also called reference station, is typically known very precisely, such as within two (2) centimeters. Each reference station includes at least one antenna and receives and observes GNSS signals from the GNSS satellites or at least some of them. The observation of GNSS signals by a reference receiver which position is precisely known, or by a plurality of reference receivers, enables the determination of information regarding the precise satellite orbits, regarding the precise satellite clock errors, and regarding the offsets (or biases) between the GNSS signals.

Figure 25:
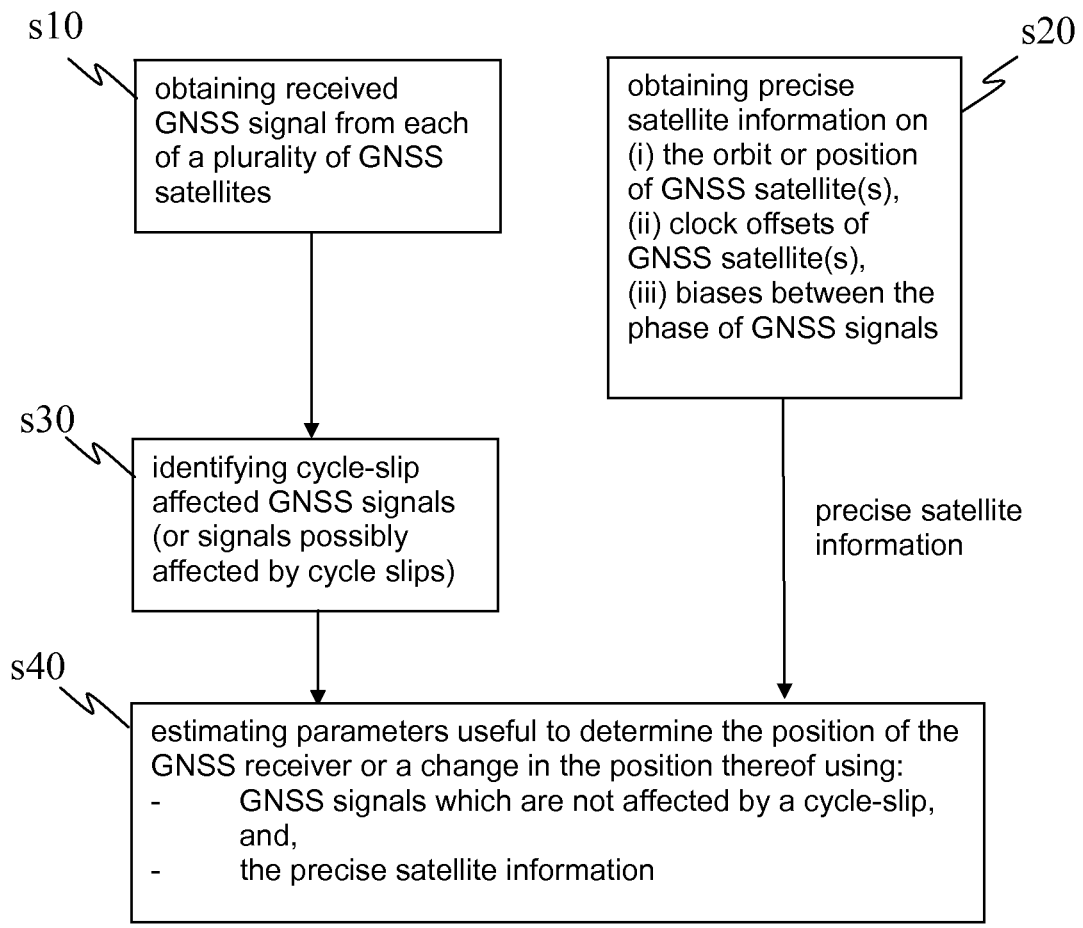
FIG. 25 is a flowchart of a method in one embodiment of the invention, wherein obtaining precise satellite information further includes obtaining biases between the phases of GNSS signals.

In one embodiment, as illustrated on FIG. 25, the precise satellite information obtained in step s20 further includes biases between the phase of two or more GNSS signals originating from one satellite, for at least one of the plurality of GNSS satellite. Providing this information as input to step s40 of estimating enables to fix the integer ambiguities. Without knowing the biases between the phases of the GNSS signal from the satellite, it is generally possible to obtain a floating solution only. In other words, the bias information is only required for fixing ambiguities, and the invention can work without said fixing (i.e. the ambiguities are considered 'floating'). However, there is also benefit from fixing ambiguities. The biases between two or more GNSS signals originating from one satellite are inherent in the generation of said GNSS signals due to delays in the satellite hardware (amplifiers, cables, filters, etc) and said information is required to resolve integer ambiguities in one or more phase measurements from at least one of the plurality of GNSS satellites.

By "inherent in the generation of said GNSS signals", it is meant that the biases can generally not be avoided in this context. The biases between two or more signals from the same satellite are a function of the processes and electrical circuitry used to generate the signals. These are mostly delays due to different propagation paths through the electrical circuits. For GPS, the L1 signal is given by a fundamental, $f_o$* 154 and for L2 it is $f_o$*120. If there was no bias, when the oscillator was first turned on, at t=0, the transmitted phase for both would zero. Then, the phase relationship would be maintained depending on the time elapsed and these frequencies, even if the frequencies are different. Then, after one second, the phase for both L1 and L2 would be zero again if no bias. The bias is due to hardware delays in the filters, cables, amplifiers, etc, in the satellite.

The advantage when the biases are available is the improved quality (or accuracy) of the final receiver position determination.

In one embodiment, obtaining s10 at least one GNSS signal from each of a plurality of GNSS satellites comprises making ranging code observations and carrier phase observations of the GNSS signals.

In one embodiment, obtaining s20 precise satellite information comprises obtaining the precise satellite information per GNSS satellite every two seconds or more frequently. For instance, the precise satellite information may be obtained per GNSS satellite every one second or more frequently.

In one embodiment, identifying s30 the cycle-slip affected subset includes detecting cycle slips using at least one of geometry-free carrier phase combinations (an example of a geometry-free carrier phase combination is given in equation (9) below) and geometry-free code carrier combinations (an example of a geometry-free code carrier combination is the Melbourne-Wubbena combination given in equation (17) below, see also reference [7] mentioned below). In particular, this may be carried out by computing geometry-free ionospheric carrier phases (the ionospheric residual carrier phase combination is an example of a geometry-free carrier phase combination which is given in equation (9) below) or by computing geometry-free Melbourne-Wubbena code-carriers (see equation (17) below). Using at least one of geometry-free carrier phase combinations and geometry-free code carrier combinations enables the determination of those signals affected or possibly affected by cycle slips.

Figure 26:
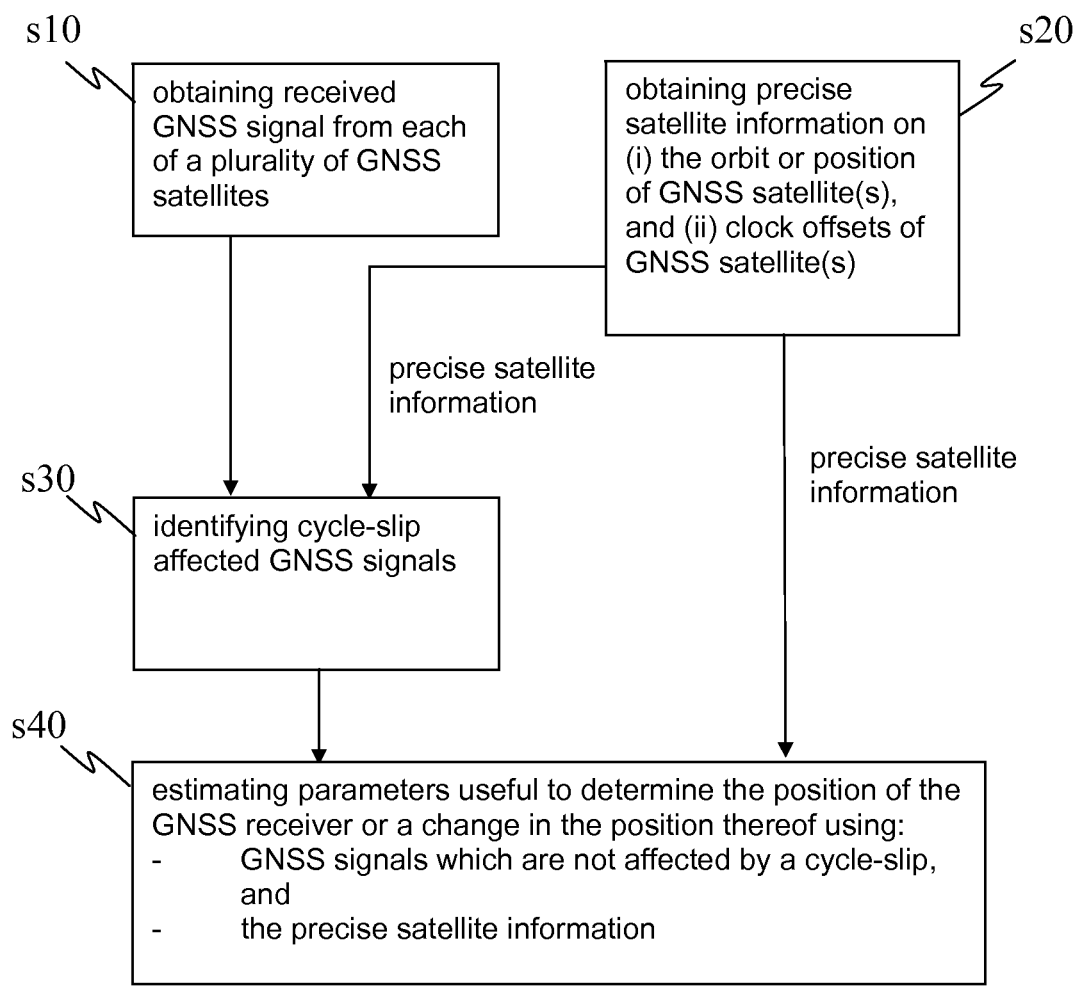
FIG. 26 is a flowchart of a method in one embodiment of the invention, wherein identifying the cycle-slip affected GNSS signals taking into account the precise satellite information.

In one embodiment, as illustrated in FIG. 26, the identification in step 30 of the cycle-slip affected GNSS signals may also take into account the precise satellite information. This embodiment is particularly advantageous if a satellite has a drift problem in that its clock is drifting compared to its expected behaviour based on the specification for the satellite atomic clock stability, at which time the clock drift cannot be determined by the satellite clock parameters which are broadcast by the satellite.

In one embodiment, the step of estimating s40 parameters useful to determine the position of the GNSS receiver or a change in the position thereof comprises determining a position change of the receiver using time-differenced carrier phase for at least some of the obtained GNSS signals which are not in the cycle-slip affected subset. Equations (5) and (6) below along with the accompanying description will show that, for a static receiver, one can form time differenced measurements for any channel that are usually only a function of the receiver clock drift and channel carrier phase lock status (i.e. cycle slips). Once cycle slips are identified, equation (5) may be applied to the carrier phase measurements from each cycle slips free channel for estimation of receiver antenna position changes. Since one usually has many such measurements for any given epoch, one may apply a least squares process to determine the best fit position change and clock change.

Figure 27:
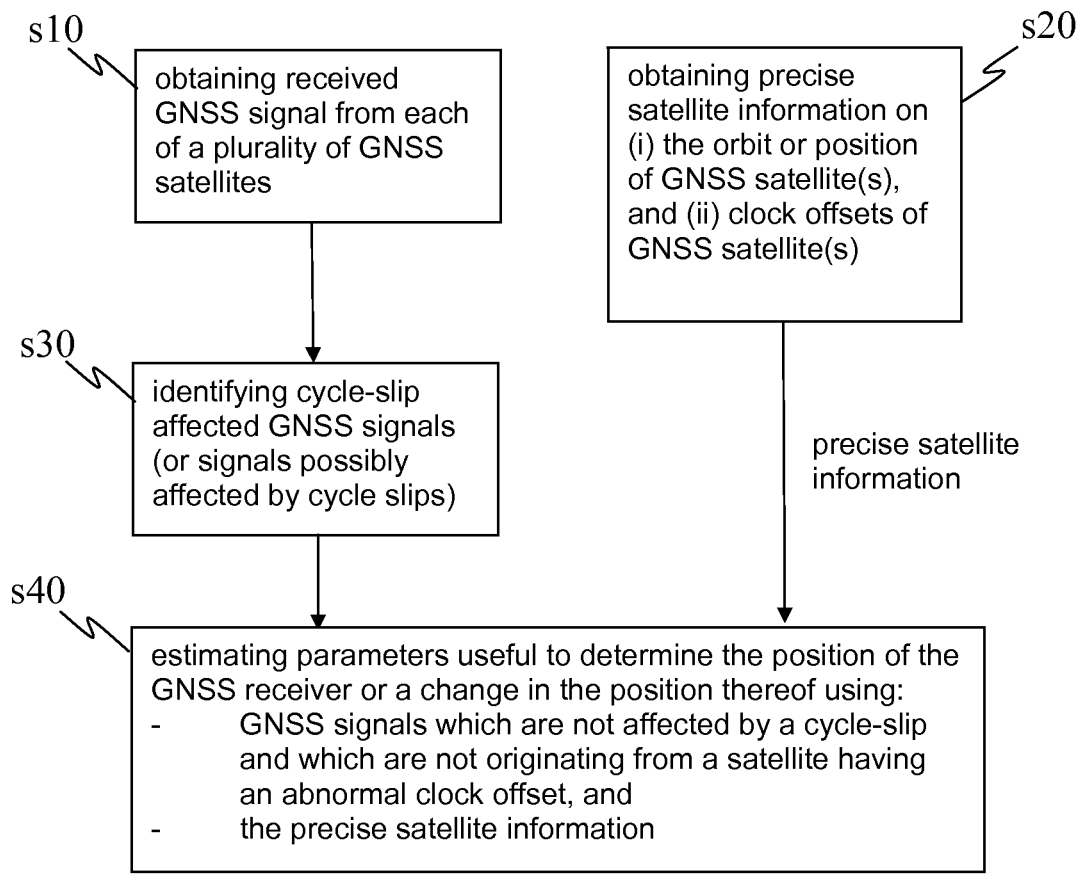
FIG. 27 is a flowchart of a method in one embodiment of the invention, wherein estimating the parameters useful to determine the position of the GNSS receiver or a change in the position thereof does not make use of the signals originating from a satellite having an abnormal clock offset.

In one embodiment, as illustrated by the flowchart of FIG. 27, in addition to excluding the GNSS signals from the subset of cycle-slip affected GNSS signals, when computing the parameters in step s40, the signals from the satellites determined, based on the precise satellite information, to have an abnormal clock offset are also excluded. A satellite is said to have an abnormal clock offset when its clock offset or drift exceeds a threshold which is based on the specification for the satellite atomic clock stability. A satellite may also be said to have an abnormal clock offset when an attempt to compute the clock offset using the broadcast clock parameters results in a residual clock error, when compared to the precise satellite information, that exceeds an acceptable threshold.

Figure 28:
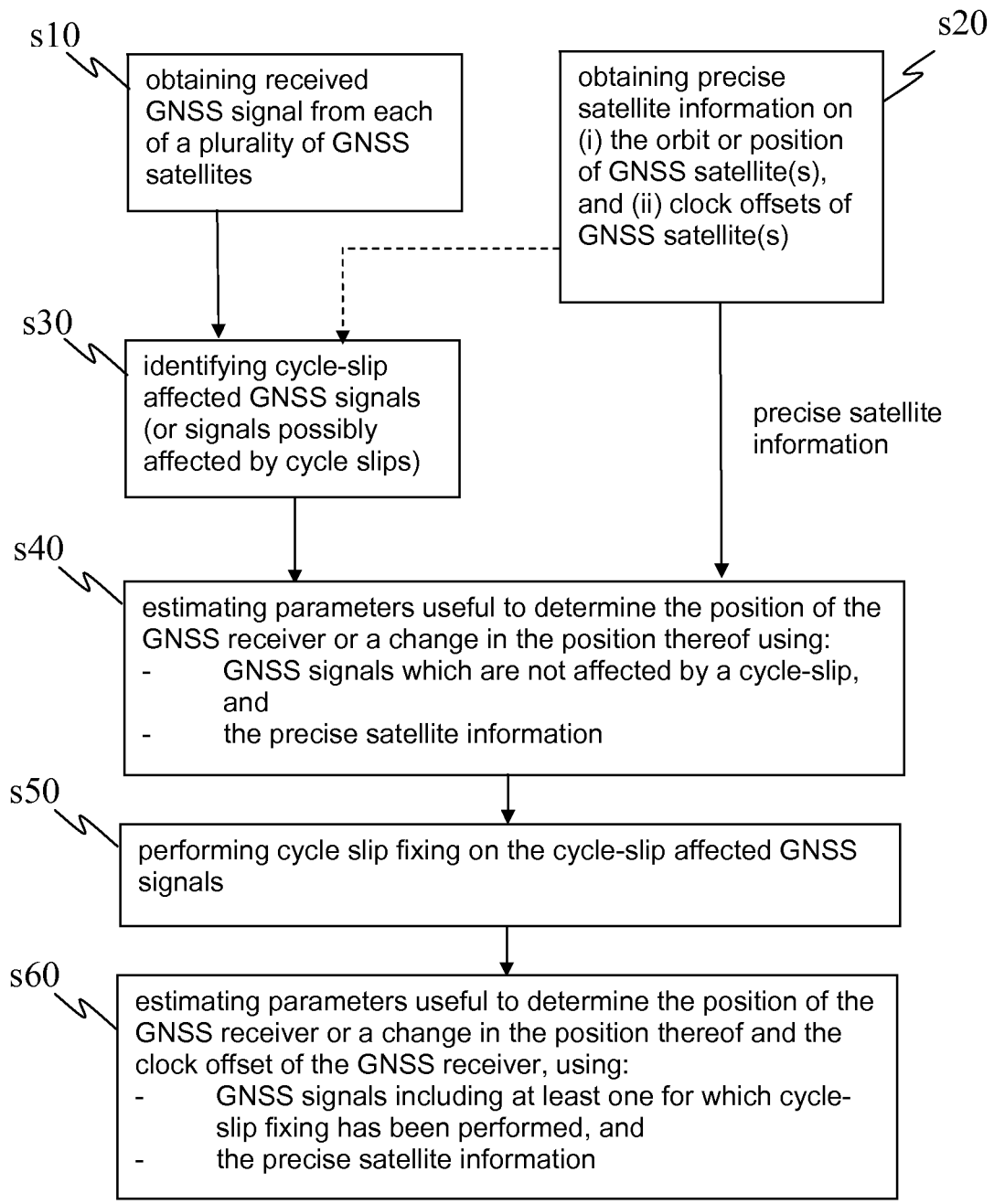
FIGS. 28 and 29 are flowcharts of methods in two embodiments of the invention respectively, wherein, after estimating the parameters useful to determine the position of the GNSS receiver or a change in the position thereof, cycle-clip fixing is performed.

In one embodiment, as illustrated by the flowchart of FIG. 28, once the parameters have been estimated in step s40, cycle slip fixing is performed in step s50 on the cycle-slip affected GNSS signals. Then, in step s60, the parameters useful to determine the position of the GNSS receiver as well as the clock offset of the GNSS receiver are estimated, again (for improving the accuracy of the parameters), based at least on one GNSS signal for which cycle slip fixing has been performed, in addition to the information that had already been used in step 40, as mentioned above.

In step s50, cycle slip fixing may be performed as follows. Once a carrier phase measurement records is suspected of containing a cycle slip, one then has to determine the most probable integer value of the cycle slip and the probability that it is actually a cycle slip. One approach is to simply round the residual to the nearest integer value and compute the probability that the remainder is simply noise. However, if additional residuals for the same satellite are available, the best set of integer values cycle slips can be determined for each channel using a search technique such as that described in Teunissen, P. J. J. (1994), "A new method for fast carrier phase ambiguity estimation", Proceeding of IEEE PLANS'94, Las Vegas, Nev., April 11-15, pp. 562-573. Once the integer valued cycle slips are determined, these are used to correct the original carrier phase measurements.

In one embodiment, estimating s60 again parameters useful to determine the position of the GNSS receiver or a change in the position thereof as well as the clock offset of GNSS receiver makes use of ionospheric free code combination (see equation (11) below and the accompanying text) and ionospheric free carrier phase combination (see equation (13) below and the accompanying text).

Figure 29:
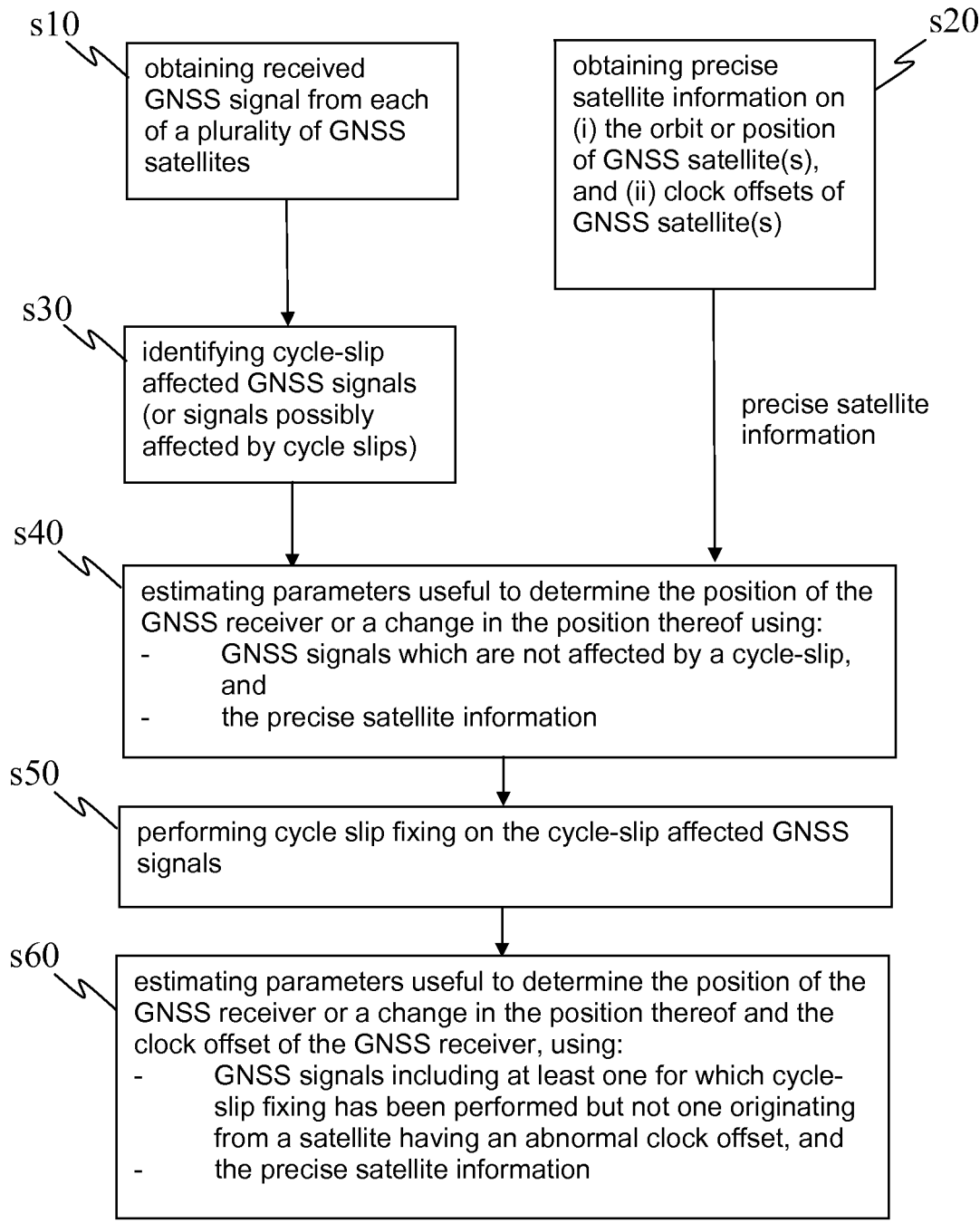

In one embodiment, as illustrated by the flowchart of FIG. 29, estimating s60 again parameters useful to determine the position of the GNSS receiver or a change in the position thereof as well as the clock offset of the GNSS receiver makes use of at least some of the obtained GNSS signals including at least one GNSS signal of the cycle-slip affected subset for which cycle slip fixing has been performed, but excluding the GNSS signals originating from a satellite determined, based on the precise satellite information, to have a clock offset or drift exceeding a threshold based on the specification for the satellite atomic clock stability, or a clock offset of drift exceeding a threshold based on a residual clock error when comparing the precise satellite information with a clock offset computed using the broadcast satellite clock parameters. Estimating s60 again parameters also makes use of the obtained precise satellite information, as explained above.

Figure 30:
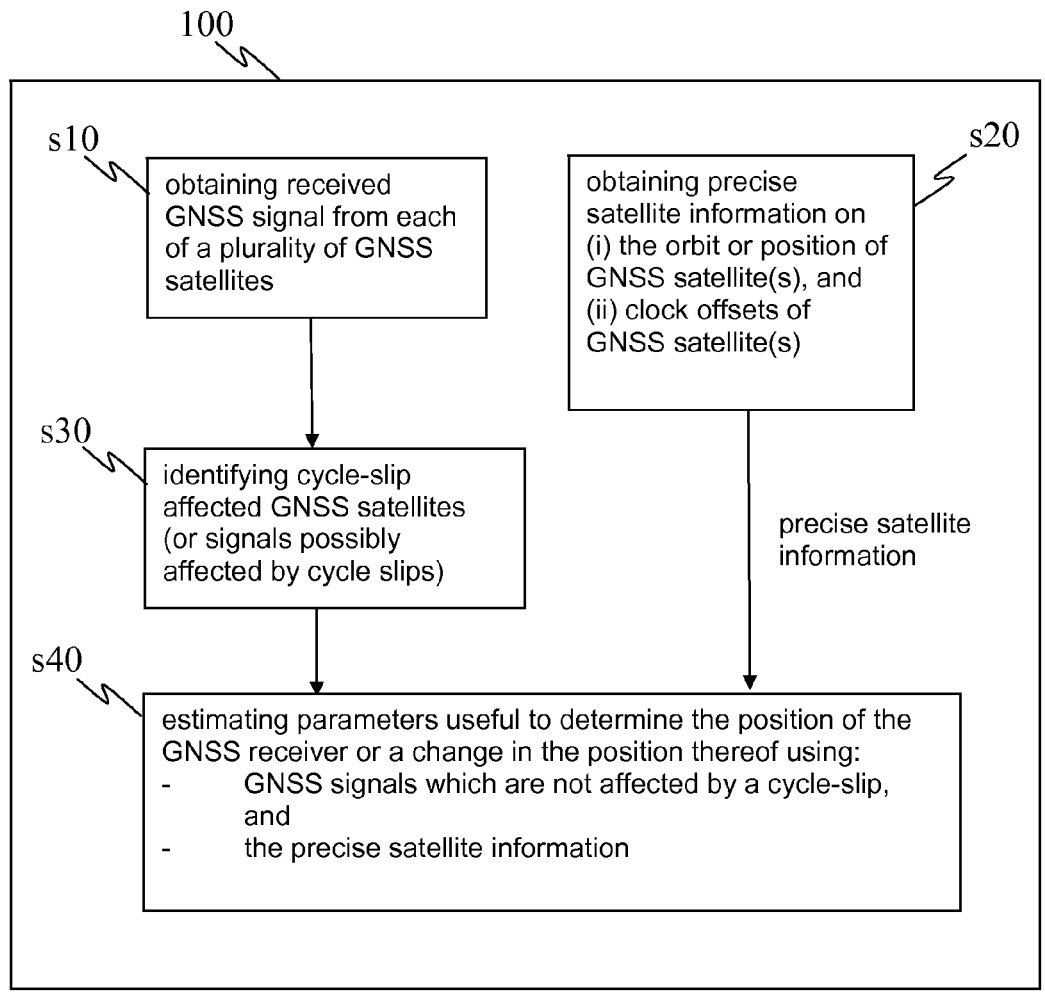
FIG. 30 schematically illustrates an apparatus in one embodiment of the invention.

FIG. 30 schematically illustrates an apparatus in one embodiment of the invention. The apparatus 100 is configured to estimate parameters useful to determine the position of a GNSS receiver or a change in the position thereof by performing the method described with reference to FIG. 24.

To do so, the apparatus 100 may comprise a processing unit, a main memory, a ROM (read only memory) or RAM (random access memory), a storage device, an input device, an output device, and a communication interface. A bus may include a path that permits communication among the components of apparatus 100.

The processing unit may include a processor, a microprocessor, or processing logic that may interpret and execute computer-executable instructions for carrying out the method including steps s10, s20, s30, s40. The main memory may include a ROM or RAM or another type of dynamic storage device that may store information and instructions for execution by processing unit. The ROM may include a ROM device or another type of static storage device that may store static information and instructions for use by the processing unit. The storage device may include a magnetic and/or optical recording medium and its corresponding drive.

The input device may include a mechanism that permits a user to input information to the apparatus, such as a keypad, a keyboard, a mouse, a pen, voice recognition and/or biometric mechanisms, etc. The output device may include a mechanism that outputs information to the operator, including a display, a printer, a speaker, etc. The communication interface may include any transceiver-like mechanism that enables the apparatus 100 to communicate with other devices and/or systems (such as to obtain the precise satellite information). For example, the communication interface may include mechanisms for communicating with another device or system via a network.

Apparatus 100 may perform certain operations or processes described herein. It may perform these operations in response to the processing unit executing software instructions contained in a computer-readable medium, such as the main memory, the ROM, and/or the storage device. A computer-readable medium may be defined as a physical or a logical memory device. For example, a logical memory device may include memory space within a single physical memory device or distributed across multiple physical memory devices. Each of the main memory, the ROM and the storage device may include computer-readable media. The magnetic and/or optical recording media (e.g., readable CDs, DVDs, or Blu-ray Discs (BDs)) of the storage device may also include computer-readable media. The software instructions may be read into the main memory from another computer-readable medium, such as the storage device, or from another device via the communication interface.

The software instructions contained in the main memory may cause the processing unit to perform operations or processes described herein. Alternatively, hardwired circuitry may be used in place of or in combination with software instructions to implement processes and/or operations described herein. Thus, implementations described herein are not limited to any specific combination of hardware and software.

Let us now further explain the context in which the invention has been developed for a better understanding thereof.

Service providers of differential Global Navigation Satellite System (GNSS) positioning services like Virtual Reference Station (VRS) networks, single base Real-Time Kinematic (RTK) corrections, marine reference stations, Local Area Augmentation Systems (LAAS) for precision landing etc. typically require receiver autonomous integrity monitoring (RAIM) of the GNSS measurements or corrections prior to transmission via some communication media like radio, satellite or IP. Although various methods for RAIM exist in the literature (see for instance Lee, Y. C. (1992), *Receiver autonomous integrity monitoring (RAIM) capability for sole-means GPS navigation in the oceanic phase of flight*, Position Location and Navigation Symposium, pp 464-472; Hewitson, S., Lee, H. K., and Wang, J. (2004), *Localization Analysis for GPS/Galileo Receiver Autonomous Integrity Monitoring*, Journal of Navigation, 57, pp. 245-259; and Hewitson, S. and Wang, J. (2007), *GNSS Receiver Autonomous Integrity Monitoring with a Dynamic Model*, Journal of Navigation, 60 pp 247-263) and are incorporated in various GNSS products, most were developed for classical GNSS navigation solutions. These solutions mainly use pseudorange measurements and satellite orbit and clock information disseminated via the navigation broadcast message.

More advanced methods like the analysis of raw GNSS data, that will be described in one embodiment, is already used in Trimble Infrastructure and Monitoring Solutions software additionally use carrier phase measurements and combinations of various frequencies to detect errors in the GNSS measurements from each reference receiver. Although this can be done using broadcast satellite ephemeris, outlier detection levels are limited by the errors in the computed satellite positions and clock offsets. This can be improved using—for example—IGS ultra rapid orbits (see Springer, T. A. and Hugentobler, U., *IGS ultra rapid products for (near) real-time applications*, Physics and Chemistry of the Earth, Part A: Solid Earth and Geodesy, Volume 26, Issues 6-8, pp. 623-628) which significantly reduce the satellite position errors. However, satellite clock offsets are typically not available at a high enough rate or quality to allow modelling of the short-term instabilities (also called "transient" instabilities) that are occasionally observed in GNSS satellite clocks.

The single base real-time kinematic (RTK) engine used in Trimble GNSS receivers also performs raw data analysis of the measurements from the reference and rover receivers. A code-carrier combination and the ionospheric residual carrier combination are used to detect and flag cycle slips that are not flagged by the signal tracking firmware embedded in the receivers. As well, the RTK engine uses time differenced L1 carrier phase measurements from the reference receiver to detect gross satellite position errors and unstable satellite clocks. Using only broadcast satellite ephemeris or IGS ultra rapid orbits, the RTK engine would reject all measurements from a satellite during periods of short-term clock instability. Without access to high rate and high quality satellite clock offsets, this is the best course of action for the RTK engine but reduces the number of satellites available for ambiguity resolution and positioning.

The current Trimble CenterPoint RTX system (TCP) (see international application WO 2011/034624 A2, WO 2011/034615 A2, WO 2011/034616 A2, WO 2011-034617 A2, and WO 2011/034614 A2, already mentioned above) consists of a global network of more than 100 GNSS reference receivers and multiple redundant servers. The TCP is an example of a system used by some embodiments of the present invention that compute precise GNSS satellite orbits and clocks in real-time. Other global networks or regional sub-networks of GNSS reference stations may also be used, and the present invention is not limited to the use of any particular global network, or regional sub-network. Using the TCP, the expected accuracy of the positions and clock offsets are approximately three centimeters. For all tracked satellites, precise positions are transmitted via L-Band satellite link over a 20 second interval while precise clock offsets are transmitted every 2 seconds. These intervals may be reduced if there is sufficient transmission bandwidth. Using the NTRIP standard, the precise orbits and clocks can be transmitted at 1 Hz using TCP-IP (internet protocol). Some embodiments of the invention provide the module in charge of estimating the parameters useful to determine the position of the receiver with access to the precise satellite positions and clock offsets at 1 Hz, the end result being a more robust handling of periods of satellite clock instability, improvements in code and carrier outlier detection and more reliable cycle slip detection and fixing in general. For a single base RTK reference station, the immediate benefit is the reduction in the number of rejected measurements during periods of satellite clock instability. Both the RTK engine that computes positions and a method that will be described in one embodiment that is used to analyse the raw GNSS data could also be extended to use the TCP orbits and clocks to determine the position of a reference station with increased accuracy.

Analysis of the raw GNSS data that was mentioned previously as an advanced method, hereafter will be referred to as the raw data analysis method, will be described in one embodiment, and is designed to detect outliers and carrier phase cycle slips in the measurements from a single GNSS receiver. This method is currently used in Trimble infrastructure software products to analyze the measurements from GNSS reference receivers and antenna where the coordinates of the antenna reference point (ARP) are typically known at the centimeter level within the International Terrestrial Reference Frame (ITRF). Pseudorange and carrier phase measurements from each GNSS receiver channel are high pass filtered and the residuals from the filters are checked for outliers and cycle slips.

For pseudorange $P_{ikm}^j$ and carrier phase $\Phi_{ikm}^j$ observations from a GNSS receiver to satellite j on frequency band k and modulation type m, the following observation model is assumed to relate the observations at epoch i to certain physical quantities:

$$P_{ikm}^j = \rho_i^j + c\Delta t_i - c\Delta t_i^j + T_i^j + I_{iP_k}^j + b_{iP_{km}} - b_{iP_{km}}^j + m_{iP_{km}}^j + \epsilon_{iP_{km}}^j \quad (1)$$

$$\Phi_{ikm}^j = \rho_i^j + c\Delta t_i - c\Delta t_i^j + T_i^j + I_{i\Phi_k}^j + b_{i\Phi_{km}} - b_{i\Phi_{km}}^j + \lambda_k N_{ikm}^j + m_{i\Phi_{km}}^j + \epsilon_{i\Phi_{km}}^j \quad (2)$$

where
$\rho_i^j$ is the receiver to satellite j geometric range at epoch i
c is the speed of light
$\Delta t_i$ is receiver clock error at epoch i
$\Delta t_i^j$ is satellite j clock error at epoch i
$T_i^j$ is the receiver to satellite j tropospheric delay at epoch i $$I_{iP_k}^j = \frac{I_{1i}^j}{f_k^2} + \frac{2I_{2i}^j}{f_k^3} + \frac{3I_{3i}^j}{f_k^4}$$

is the receiver to satellite j code ionospheric delay at frequency $f_k$ at epoch i $$I_{i\Phi_k}^j = -\frac{I_{1i}^j}{f_k^2} - \frac{2I_{2i}^j}{f_k^3} - \frac{3I_{3i}^j}{f_k^4}$$

is the receiver to satellite j carrier phase ionospheric delay at frequency $f_k$ at epoch i
$b_{iP_{km}}$ is the receiver pseudorange bias for modulation type m on frequency $f_k$ at epoch i
$b_{iP_{km}}^j$ is the satellite j pseudorange bias for modulation type m on frequency $f_k$ at epoch i
$b_{i\Phi_{km}}$ is the receiver phase bias for modulation type m on frequency $f_k$ at epoch i $b_{1\Phi_{km}}{}^j$ is the satellite j phase bias for modulation type m on frequency $f_k$ at epoch i $\lambda_k$ is the frequency $f_k$ wavelength $N_{ikm}{}^j$ is the receiver to satellite j integer ambiguity term for wavelength $\lambda_k$ at epoch i $m_{iP_{km}}{}^j$ is the receiver to satellite j code multipath for modulation type m on frequency $f_k$ at epoch i $m_{i\Phi_{km}}{}^j$ is the receiver to satellite j phase multipath for modulation type m on frequency $f_k$ at epoch i $\epsilon_{iP_{km}}{}^j$ is the receiver to satellite j code random noise term on frequency $f_k$ at epoch i $\epsilon_{i\Phi_{km}}{}^j$ is the receiver to satellite j phase random noise term on frequency $f_k$ at epoch i Table 1 lists some of the PRN signal types used by various GNSS (where QZSS stands for "Quasi Zenith Satellite System").

TABLE 1

| GNSS | Signal name | Frequency (MHz) |
|---|---|---|
| GPS (and QZSS) | L1-C/A, L1C, L1P | 1575.420 |
| | L2C, L2P | 1227.600 |
| | L5 | 1176.450 |
| GLONASS | L1OF, L1SF (FDMA) | 1602 + n × 0.5625 |
| | L2OF, L2SF (FDMA) | 1246 + n × 0.4375 |
| | L1OC, L1OCM, L1SC (CDMA) | 1575.420 |
| | L2OC, L2SC (CDMA) | 1242.000 |
| | L3OC, L3SC (CDMA) | 1207.140 |
| | L5OCM (CDMA) | 1176.450 |
| GALILEO | E1 | 1575.420 |
| | E5A | 1176.450 |
| | E5B | 1207.140 |
| | E6 | 1278.750 |
| COMPASS | B1 | 1561.098 |
| | B2 | 1207.140 |
| | B3 | 1268.520 |

By first removing the geometric range ($\Sigma_i{}^j$), receiver clock error ($\Delta t_i$), satellite clock error ($\Delta t_i{}^j$) and tropospheric delay ($T_i{}^j$) from equations (1) and (2), it is possible to use a relatively simple two state filter to filter the pseudorange and carrier phase measurements from each channel. (This will be more fully described in the description leading up to equation (8). In the paragraph following equation (8), it is mentioned that the measurement described in equation (8) may be passed through a relatively simple high pass filter thus providing residuals that can be analyzed to detect carrier phase outliers and fix cycle slips. The same approach may be used for pseudorange measurements and the residuals analyzed to detect pseudorange outliers. For the high pass filter, a Kalman filter may be used to estimate an absolute state and a time derivative assuming the underlying model is a Gauss-Markov process). The geometric range $\rho_i{}^j$ is computed from the known GNSS antenna position and the satellite position is computed from any available ephemeris. The satellite clock error $\Delta t_i{}^j$ is computed from the same ephemeris and the tropospheric delay $T_i{}^j$ is computed, for example, from a model such as that described in Niell, A. E., *Global mapping functions for the atmosphere delay at radio wavelengths*, Journal of Geophysical Research, 1996 (here referred to as "reference [2]").

Removing the geometric range $\rho_i{}^j$, satellite clock error $\Delta t_i{}^j$ and tropospheric delay $T_i{}^j$ from equations (1) and (2) gives:

$$P_{ikm}{}^j = c\Delta t_i + I_{iP_k}{}^j + b_{iP_{km}}{}^j - b_{iP_{km}}{}^j + m_{iP_{km}}{}^j + \epsilon_{iP_{km}}{}^j \quad (3)$$

$$\Phi_{ikm}{}^j = c\Delta t_i + I_{i\Phi_k}{}^j + b_{i\Phi_{km}}{}^j - b_{i\Phi_{km}}{}^j + \lambda_k N_{ikm}{}^j + m_{i\Phi_{km}}{}^j + \epsilon_{i\Phi_{km}}{}^j \quad (4)$$

The receiver clock error $\Delta t_i$ can be removed as follows. At any epoch i, the receiver clock error $\Delta t_i$ is common to the code and carrier phase measurements from all satellites and can be determined in a variety of ways, such as, for instance, median, mean, least squares, weighted least squares, and Kalman filter.

Alternatively, the receiver clock error $\Delta t_i$ can be eliminated by differencing equations (3) and (4) but this combination is dominated by pseudorange noise. Since one of the main purposes of the raw data analysis method is the detection and repair of carrier phase cycle slips, it is important that the receiver clock error $\Delta t_i$ is determined with an accuracy at the level of the carrier phase noise. Due to the carrier phase ambiguity, it is difficult to directly use equation (4) to determine an absolute receiver clock error $\Delta t_i$ at any epoch.

However, it is possible to accurately determine the change in the receiver clock error between consecutive epochs using time differenced carrier phase measurements. Forming time differences of equation (2) gives:

$$\partial\Phi_{ikm}{}^j = \partial\rho_i{}^j + c\partial\Delta t_i - c\partial\Delta t_i{}^j + \partial T_i{}^j + \partial I_{i\Phi_k}{}^j + \partial b_{i\Phi_{km}}{}^j - \partial b_{i\Phi_{km}}{}^j + \lambda_k \partial N_{ikm}{}^j + \partial m_{i\Phi_{km}}{}^j + \epsilon_{i\partial\Phi_{km}}{}^j \quad (5)$$

where $\partial\Phi_{ikm}{}^j$ is the receiver to satellite j carrier phase delta for modulation type m on frequency $f_k$ from epoch i−1 to epoch i $\partial\rho_i{}^j$ is the receiver to satellite j geometric range delta from epoch i−1 to epoch i $\partial\Delta t_i$ is the receiver clock error delta from epoch i−1 to epoch i $\partial\Delta t_i{}^j$ is the satellite clock error delta from epoch i−1 to epoch i $\partial T_i{}^j$ is the receiver to satellite tropospheric delay delta from epoch i−1 to epoch i $\partial I_{i\Phi_k}{}^j$ is the receiver to satellite j carrier phase ionospheric delay delta at frequency $f_k$ from epoch i−1 to epoch i $\partial b_{i\Phi_{km}}$ is the receiver phase bias delta for modulation type m on frequency $f_k$ from epoch i−1 to epoch i $\partial b_{i\Phi_{km}}$ is the satellite j phase bias delta for modulation type m on frequency $f_k$ from epoch i−1 to epoch i $\partial N_{ikm}{}^j$ is the receiver to satellite j integer ambiguity delta (cycle slip) for modulation type m on frequency $f_k$ from epoch i−1 to epoch i $\partial m_{i\Phi_{km}}{}^j$ is the receiver to satellite j phase multipath delta for modulation type m on frequency $f_k$ from epoch i−1 to epoch i $\epsilon_{i\partial\Phi_{km}}{}^j$ is the receiver to satellite j carrier phase delta noise for modulation type m on frequency $f_k$ from epoch i−1 to epoch i Generally the raw data analysis method is performed with data collected by one reference receiver at an epoch update rate of 1 Hz or higher. When the interval between consecutive epochs is less than or equal to one second, many of the terms in equation (5) will effectively cancel. Examining each term in the equation leads to the following conclusions:

In most circumstances the error in the receiver to satellite geometric range delta term, $\partial\rho_i{}^j$, computed from broadcast ephemeris does not exceed ±3 mm/s (Peyton, D. R. (1990). *An investigation into acceleration determination for airborne gravimetry using the global positioning system*. University of New Brunswick. Frediction: University of New Brunswick, here referred to as "reference [3]").

For GPS satellites, the clock error can be computed using a second order polynomial with coefficients provided in the broadcast ephemeris message. The accuracy of this parameterization is largely dependent on both the long term and short term stability of the atomic frequency standard used to control the timing of the satellite clock. GNSS satellites typically use atomic clocks with long term stabilities in the range of $10^{-11}$ to $10^{-14}$ seconds/ second. Short term stability, as determined by the Allan variance of the clock is given in the reference: Hesselbarth, A., & Wanninger, L., *Short-term stability of GNSS satellite clocks and its effects on precise point positioning*, Dresden University of Technology, Geodetic Institute, Dresden, Germany: Dresden University of Technology, 2008 (here referred to as "reference [4]"). It is therefore expected that the error in the satellite clock error delta term, $\partial \Delta t_i^j$, computed from broadcast ephemeris will be no more than a few millimeters.

The residual error in the tropospheric delay computed from an empirical model is generally no more than 20% of the total delay at zenith mapped to the line of sight. Furthermore, the rate of change of the residual error at zenith is typically no more than about 1 cm/hour. Even when this error is mapped to the line of sight, it will still be sub-millimeter and so the receiver to satellite tropospheric delay delta term, $\partial T_i^j$, can be neglected.

During periods of quiet space weather activity, ionospheric delay can be considered constant over periods of at least a few minutes and so that the receiver to satellite carrier phase ionospheric delay delta term, $\partial I_{i\Phi_k}^j$, is usually negligible.

Receiver and satellite carrier phase biases are expected to remain constant over fairly long time periods and so the bias delta terms, $\partial b_{i\Phi_{km}}$ and $\partial b_{i\Phi_{km}}^j$ should be effectively zero over intervals of at least a few minutes.

According to Wanninger, L. a., *Carrier phase multipath calibration of GPS reference stations*, Salt Lake City: Institute of Navigation, 2000 (here referred to as "reference [5]"), the dominant time periods in carrier phase multipath range from 10 to 45 minutes depending on the distance between the GNSS antenna and the reflector (i.e., between the GNSS receiver antenna and the multipath source, namely the reflective source causing the additional signal tracked by the receiver). Therefore, the carrier phase multipath delta term, $\partial m_{i\Phi_{km}}^j$, should be—if not zero—at least much reduced.

Taking the above into consideration yields the following equation for time differenced carrier phase observations:

$$\partial \Phi_{ikm}^j = c\partial \Delta t_i + \lambda_k \partial N_{ikm}^j + \epsilon_{i\partial \Phi_{km}}^j \quad (6)$$

Figure 1:
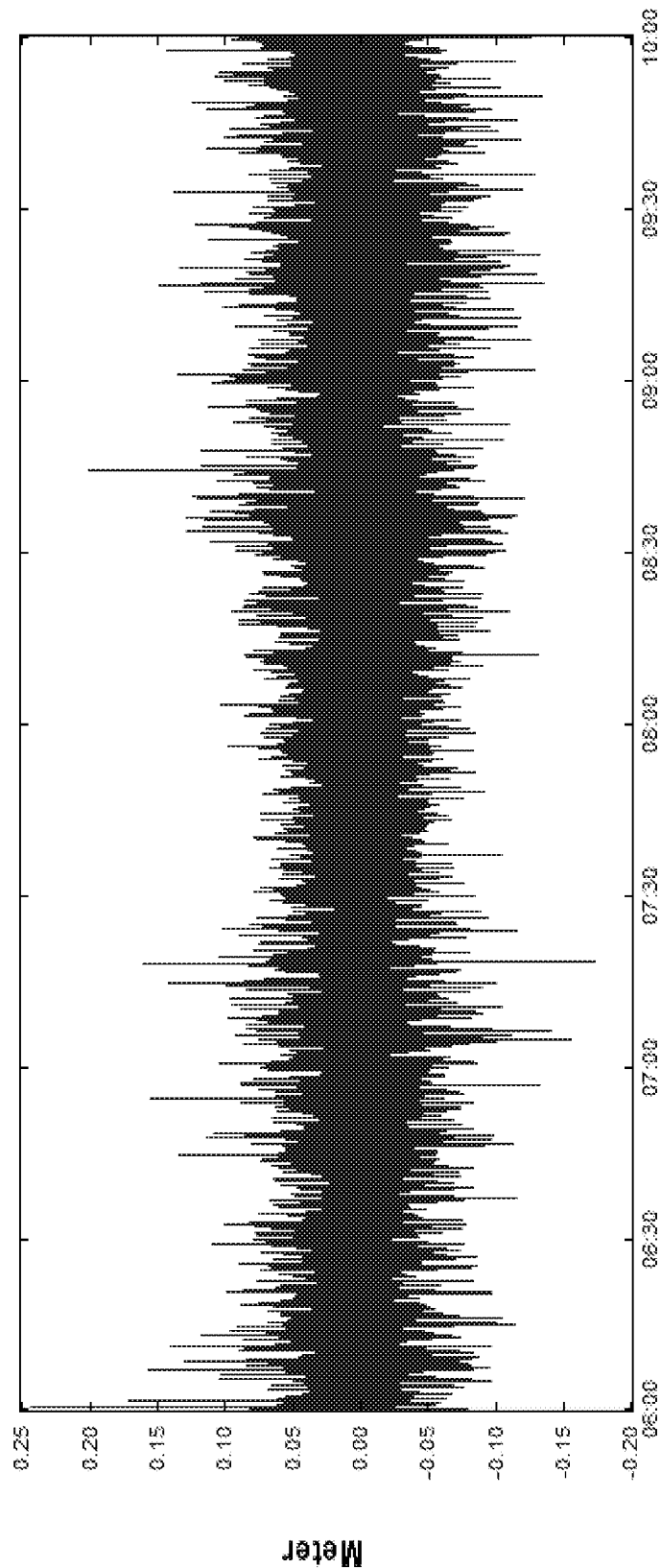
FIGS. 1 and 2 show time series of single differenced (time) and double differenced (time/satellite) L 1 C/A carrier phase measurements from GPS satellite 32 for a four hour period in which no cycle slips occurred, in order to illustrate that equation (6) is valid under most circumstances.
Figure 2:
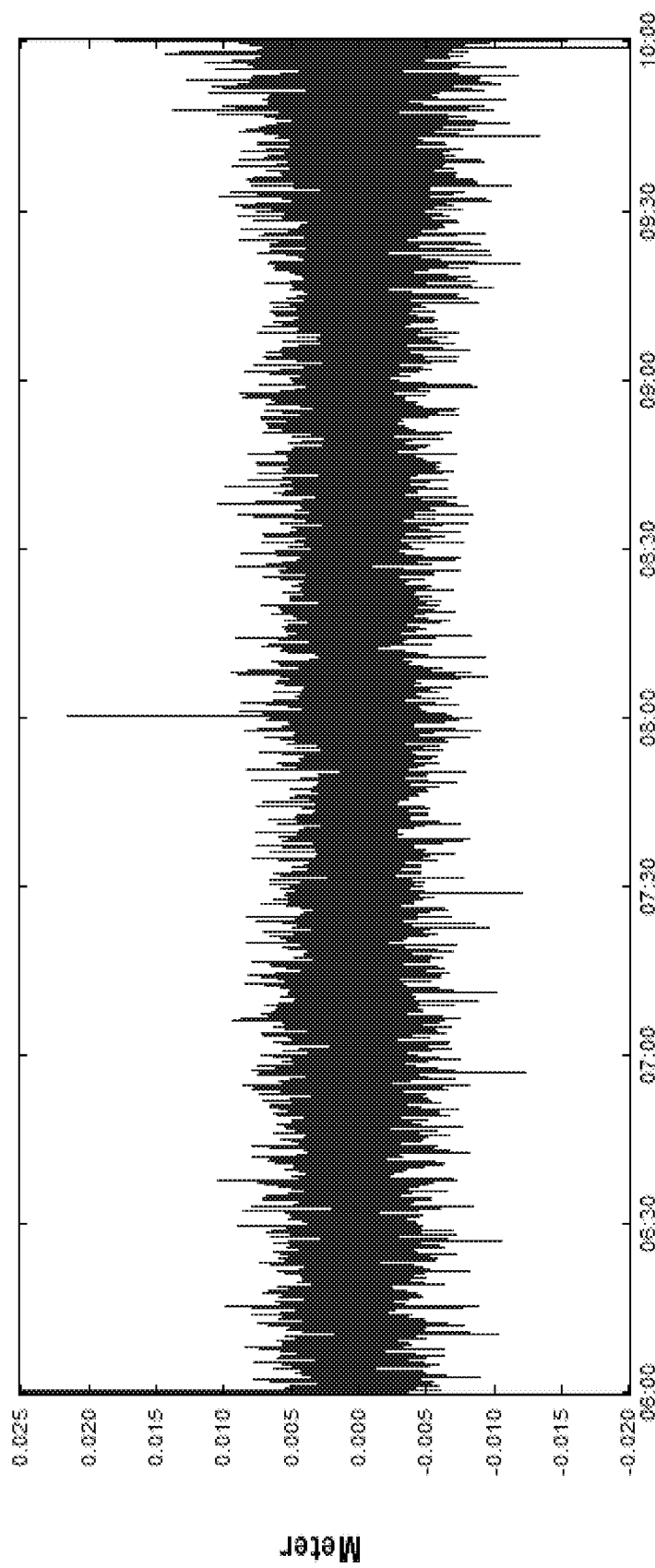

As noted above, equation (6) assumes quiet space weather and sufficiently long time constants for the terms eliminated from equation (5). During periods of high ionospheric activity and particularly ionospheric scintillation activity, the ionospheric delay delta may be significant. In addition, the clocks used by some GNSS satellites occasionally exhibit short term instabilities with an increased drift of, for example, between $10^{-10}$ and $10^{-9}$ seconds/second. Generally, however, equation (6) is valid under most circumstances and any residual errors can be included with the noise term. The validity of this statement is illustrated in FIGS. 1 and 2 which contain time series of single differenced (time) and double differenced (time/satellite) L1 C/A carrier phase measurements from GPS satellite PRN32 (GPS-32) for a four-hour period in which no cycle slips occurred. Subtracting the time single differences from GPS-32 from the time single differences from GPS-16 eliminates the receiver clock error delta term $c\partial \Delta t_i$ in equation (6). In the absence of cycle slips, the time series shown in FIG. 2 should be representative of the expected noise term in equation (6) scaled by $\sqrt{2}$.

Equation (6) provides a mechanism for estimating the receiver clock error delta between two consecutive epochs with an RMS error of a few millimeters. One possibility is to use a simple average of the carrier phase delta measurements from all satellites, frequencies and modulation types to estimate the average receiver clock error delta at each epoch. However, care has to be taken to detect cycle slips prior to inclusion of a measurement into the average. The raw data analysis method uses a two-step process. In the first step, the median receiver clock error delta is computed using carrier phase delta measurements from all channels for which the receiver did not detect a cycle slip. This is done because the median estimator is generally more robust in the presence of discontinuities such as cycle slips. In the second step, a simple average of the carrier phase delta measurements that are not outliers relative to the median estimate are used to compute the final receiver clock error delta relative to the previous epoch.

Returning to equations (3) and (4), what is required is a means to estimate the receiver clock error at each epoch i. However, for the purpose of cycle slip detection and estimation, the absolute receiver clock error is not as important as the receiver clock error delta between the epochs of the previous and current carrier phase measurements. It is therefore sufficient to construct an estimate of the receiver clock error by integrating the average receiver clock error deltas from each epoch as follows:

$$c\Delta t_i^\Phi = c\Delta t_0 + c\sum_{i=1}^{n}[\partial \Delta t_i^\Phi] \quad (7)$$

where
$\Delta t_i^\Phi$ is the receiver clock error at epoch i based on carrier phase
$\Delta t_0$ is the receiver clock error at epoch 0
$\partial \Delta t_i^\Phi$ is the average receiver clock error delta estimated using carrier phase deltas from epoch i−1 to epoch i The receiver clock error at epoch 0 can be computed from the average of all pseudorange measurements from the same epoch or can simply be assumed to be zero.

Substituting equation (7) into equation (4) and then eliminating the receiver clock error finally gives:

$$\theta_{ikm}^j = I_{i\Phi_k}^j + b_{i\Phi_{km}} - b_{i\Phi_{km}}^j + \lambda_k N_{ikm}^j + m_{i\Phi_{km}}^j + \epsilon_{i\Phi_{km}}^j \quad (8)$$

The use of the symbol $\theta_{ikm}^j$ indicates that the left hand term in equation (8) is not the same as the left hand term in equation (4). This is because the receiver clock term has been estimated using equation (7) and then eliminated. In other words:

$$\theta_{ikm}^j = \Phi_{ikm}^j - \left[c\Delta t_0 + c\sum_{i=1}^{n}[\partial \Delta t_i^\Phi]\right].$$

Once the geometric range, receiver and satellite clock errors and tropospheric delay are eliminated from equation (4), the carrier phase measurements from each receiver channel can be passed through a relatively simple high pass filter and the resulting residuals analysed to detect outliers and fix carrier phase cycle slips. For this purpose, the raw data analysis method uses a Kalman filter to estimate an absolute state and a time derivative assuming the underlying model is a Gauss-Markov process.

When the raw data analysis method identifies a possible cycle slip on a particular channel, it then tries to recover the integer nature of the carrier phase cycle slip. However, this can be difficult when considering only the residual from a single channel. Thus, various linear combinations of channel residuals that share a common satellite are formed to improve the probability of successful integer recovery.

For example, the ionospheric delay term $I_{i\Phi_k^j}$ in equation (8) can be eliminated by forming an ionospheric free combination using residuals from two channels tracking GPS L1 and L2 from the same satellite.

Figure 3:
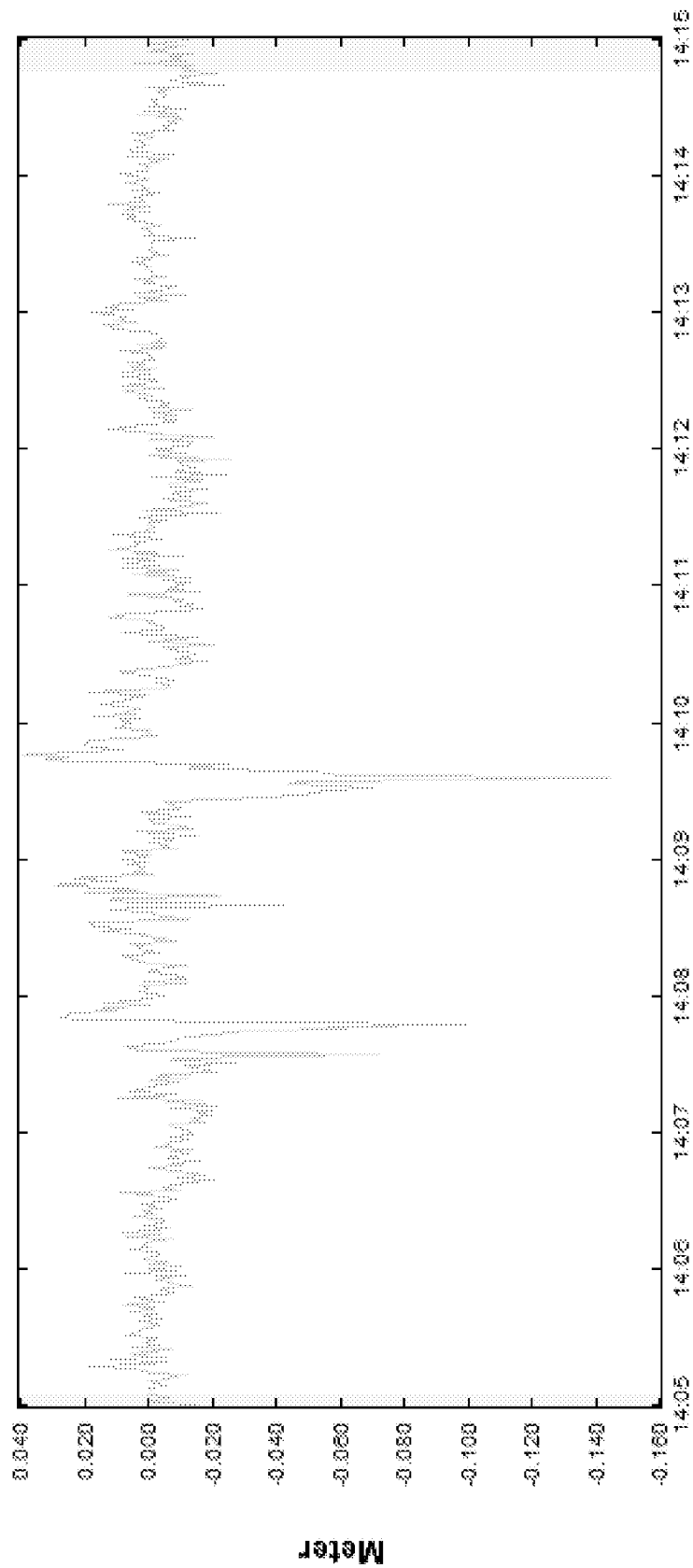
FIGS. 3 and 4 show the rate of change in the L1-C/A and L2-P carrier measurements from GPS-25 collected at a tracking station in Cambridge Bay, Northwest Territories, Canada, during an ionospheric scintillation event.
Figure 4:
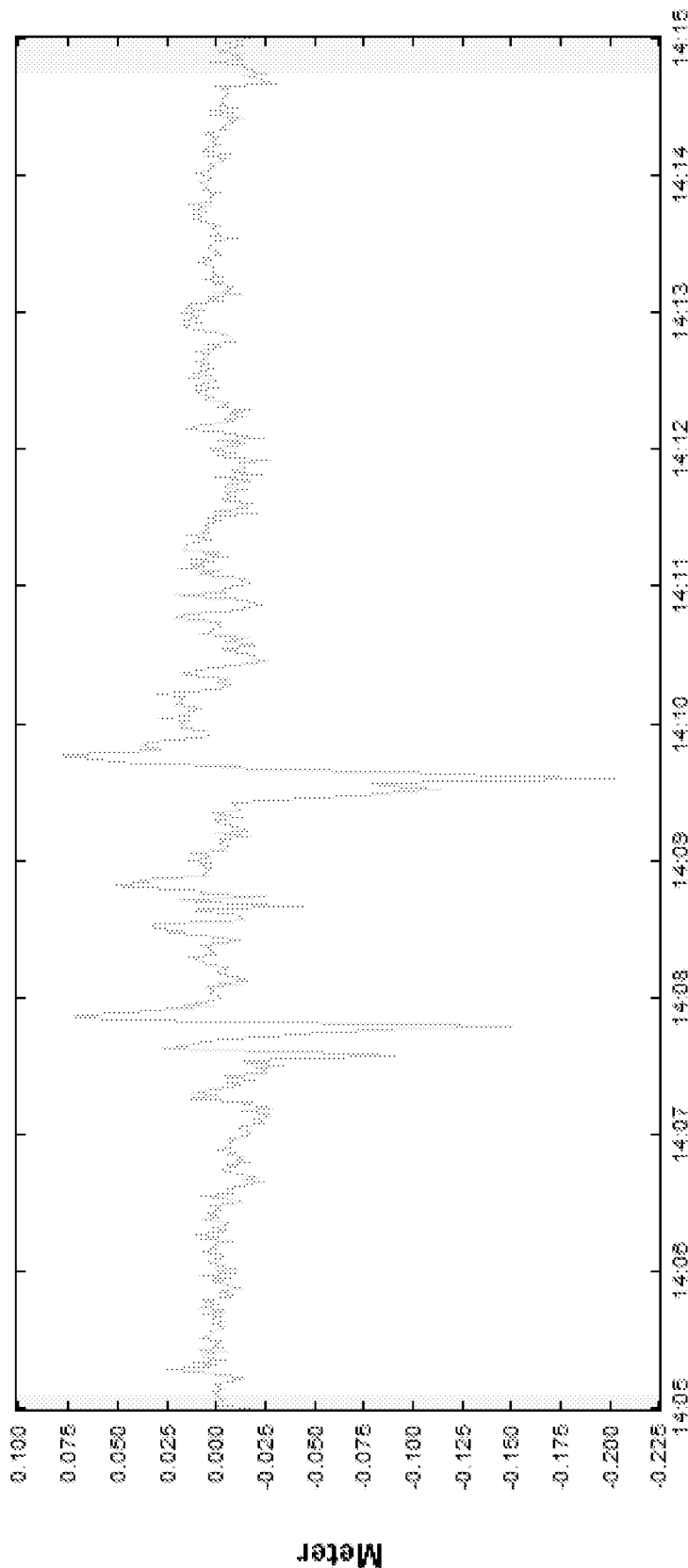

Filtering of equation (8) generally yields good results but some of the assumptions inherent in the model do not always hold true. Two issues in particular can result in the erroneous detection of cycle slips and/or incorrect cycle slip fixing. As mentioned in the previous section, ionospheric scintillation due to electron density irregularities can cause deep fading of GNSS signals and rapid fluctuations in the ionospheric delay term in equations (4) and (8). FIGS. 3 and 4 contain plots showing the rate of change in the L1-C/A and L2-P carrier measurements from GPS-25 collected at a tracking station in Cambridge Bay, Northwest Territories, Canada, during an ionospheric scintillation event on Jan. 19, 2011.

Differencing the L1-C/A and L2-P carrier phase delta time series eliminates any frequency independent terms from equation (5) as follows:

$$\partial \Phi_{il}^j = \partial \Phi_{iL1CA}^j - \partial \Phi_{iL2PE}^j$$
$$= \partial I_{i\Phi_{L1}}^j + \partial b_{i\Phi_{L1CA}} - \partial b_{i\Phi_{L1CA}}^j +$$
$$\lambda_{L1} \partial N_{iL1CA}^1 + \partial m_{i\Phi_{L1CA}}^j + \varepsilon_{i\partial\Phi_{L1CA}}^j -$$
$$(\partial I_{i\Phi_{L2}}^j + \partial b_{i\Phi_{L2PE}} - \partial b_{i\Phi_{L2PE}}^j + \lambda_{L2} \partial N_{iL2PE}^j +$$
$$\partial m_{i\Phi_{L2PE}}^j + \varepsilon_{i\partial\Phi_{L2PE}}^j)$$

Eliminating any terms with long time constants:

$$\partial \Phi_{il}^j = \partial I_{i\Phi_{L1}}^j - \partial I_{i\Phi_{L2}}^j + \lambda_I \partial N_i^j + \varepsilon_{i\partial\Phi_I}^j \quad (9)$$

Figure 5:
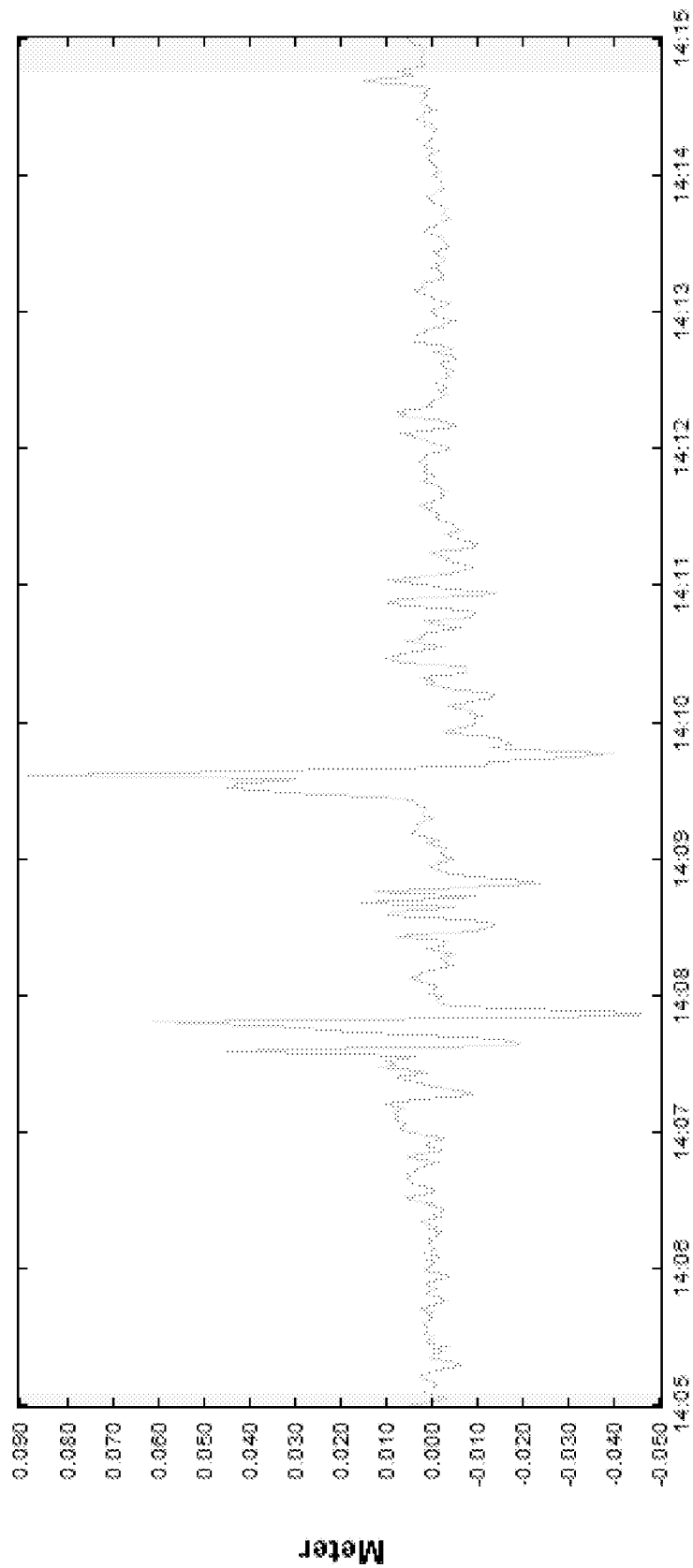
FIG. 5 shows the single differenced (time) of the L1-C/A and L2-P carrier phase delta time series for GPS-25.

Equation (9) shows that the difference between the L1-C/A and L2-P- carrier phase delta measurements will—in the absence of cycle slips—only be a function of the rate of change of the ionospheric delay. FIG. 5 contains a plot of this time series for GPS-25. This clearly shows that the high rates of change in the L1-C/A and L2-P carrier phase measurements are likely due to ionospheric scintillation.

Figure 6:
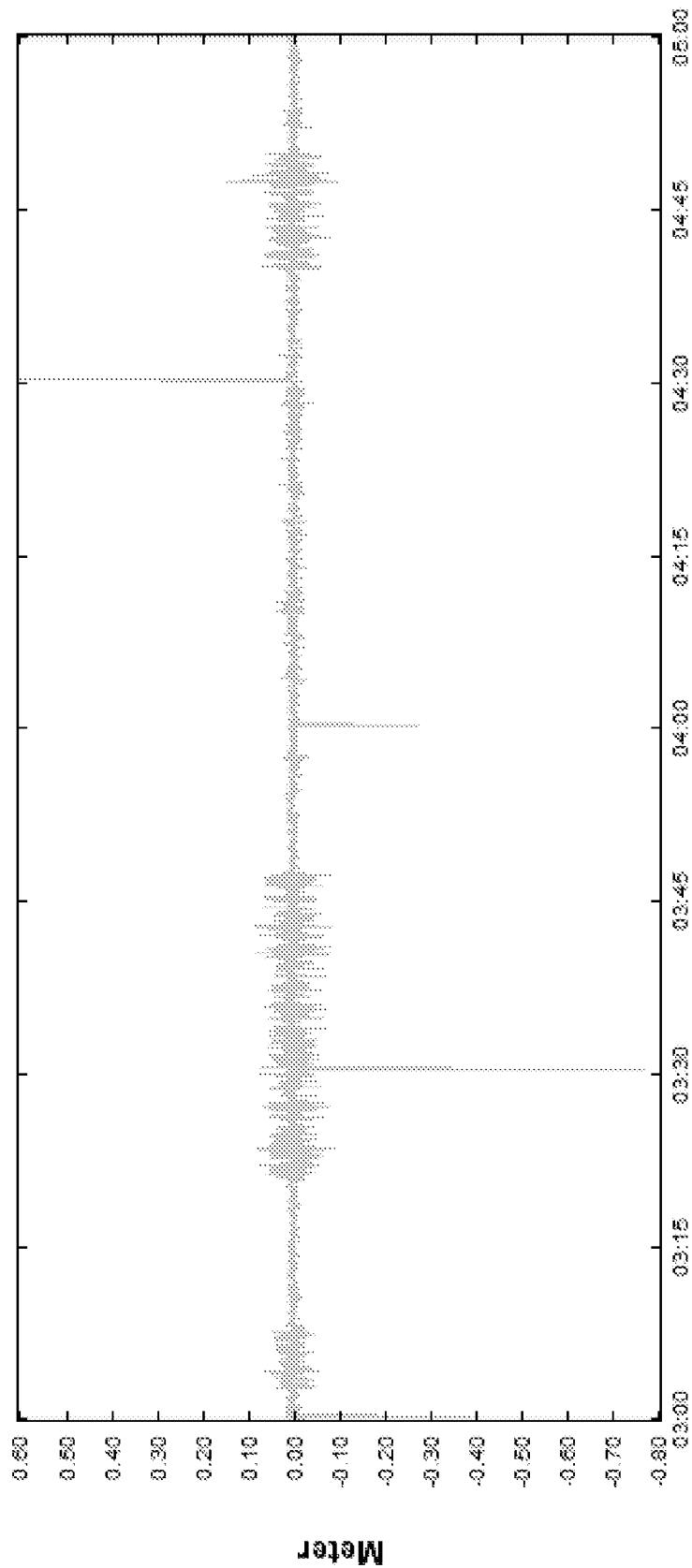
FIGS. 6, 7 and 8 show the L1-C/A, L1-P, and L2-P carrier phase delta measurements for GLONASS-07 from Aug. 17, 2010.
Figure 7:
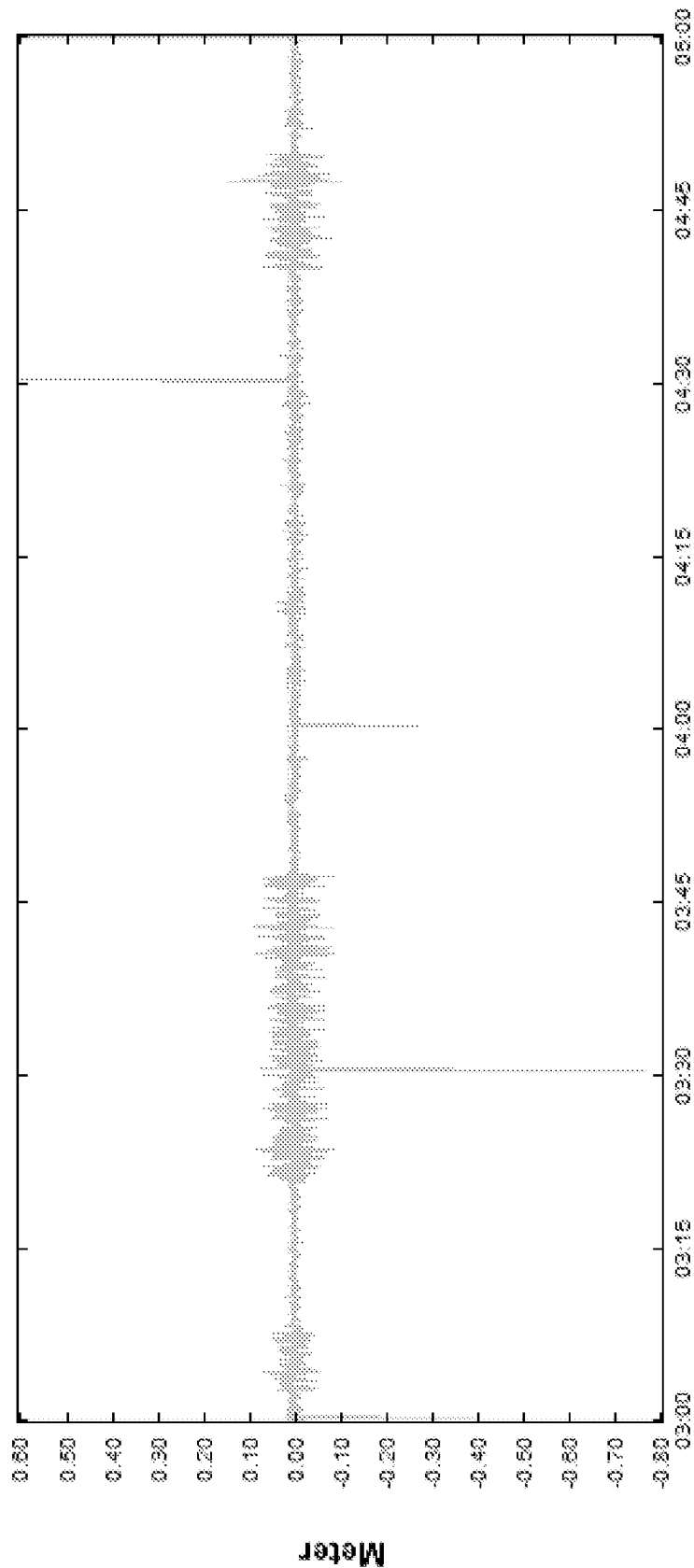
Figure 8:
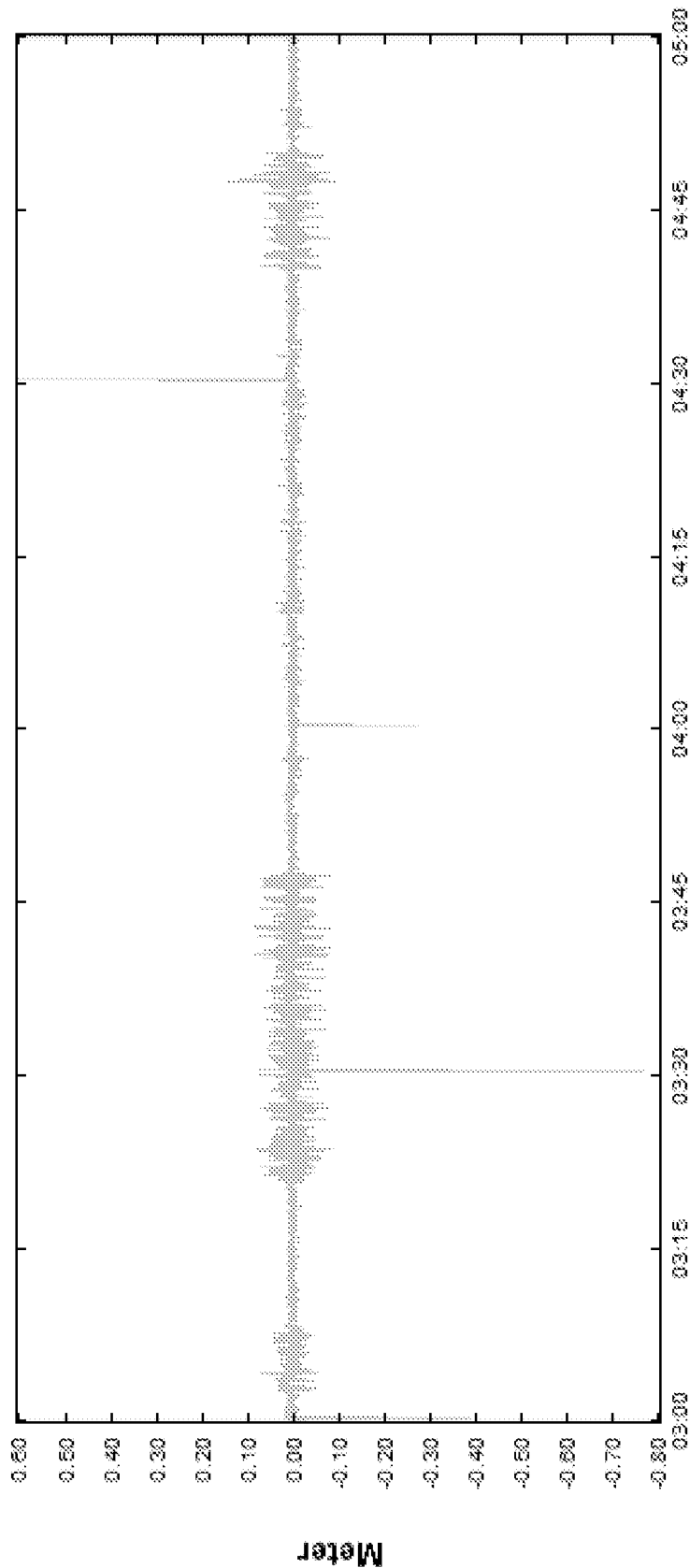
Figure 9:
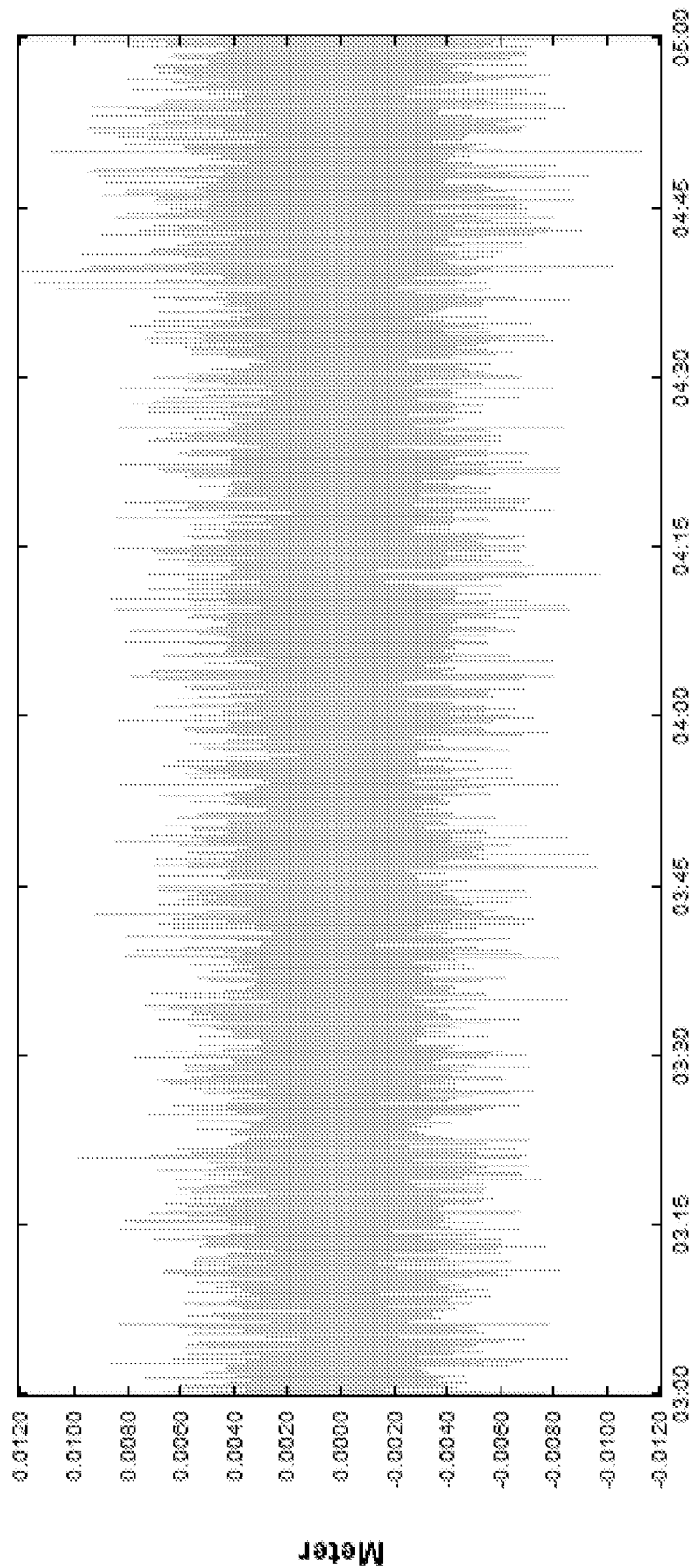
FIGS. 9, 10 and 11 show the differencing of the L1-C/A and L1-P (FIG. 9), L1-C/A and L2-P (FIG. 10), and L1-P and L2-P (FIG. 11) carrier phase delta measurements.
Figure 10:
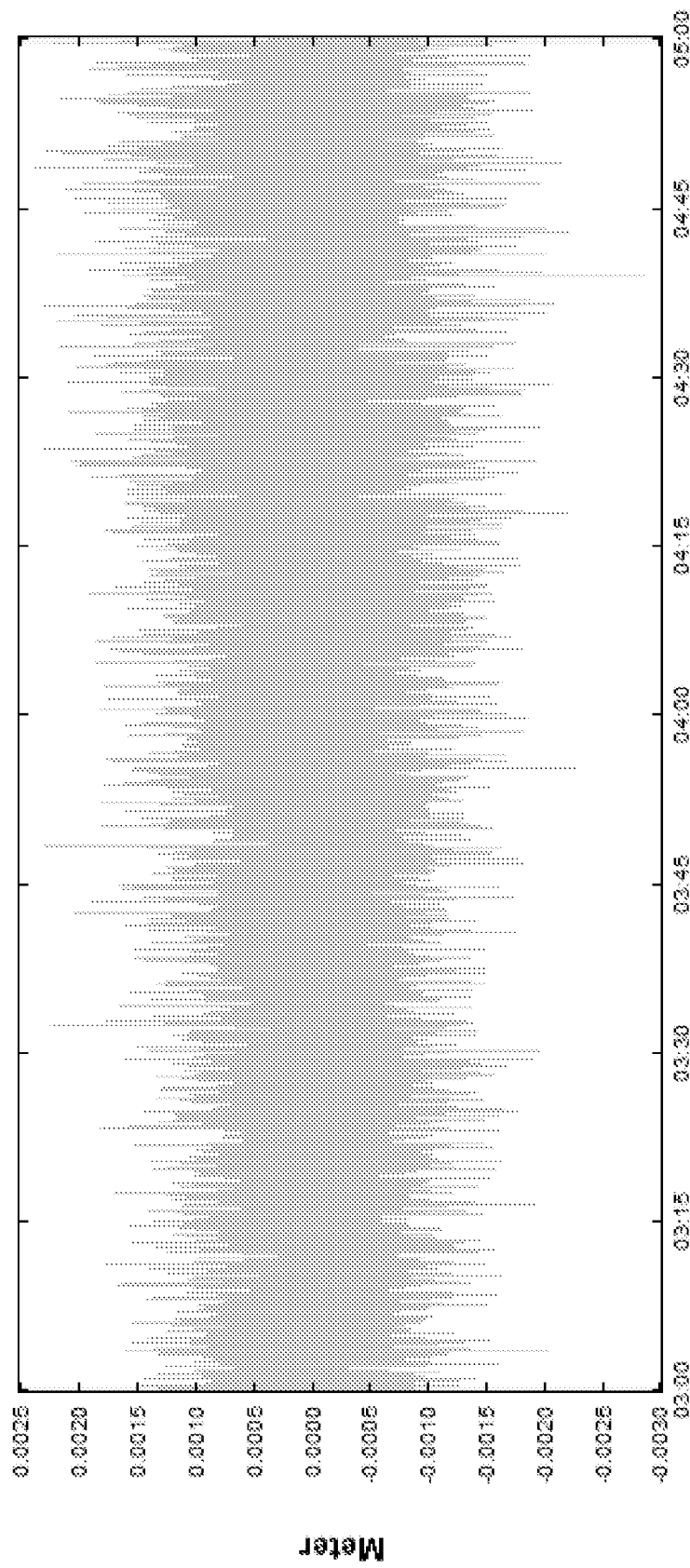
Figure 11:
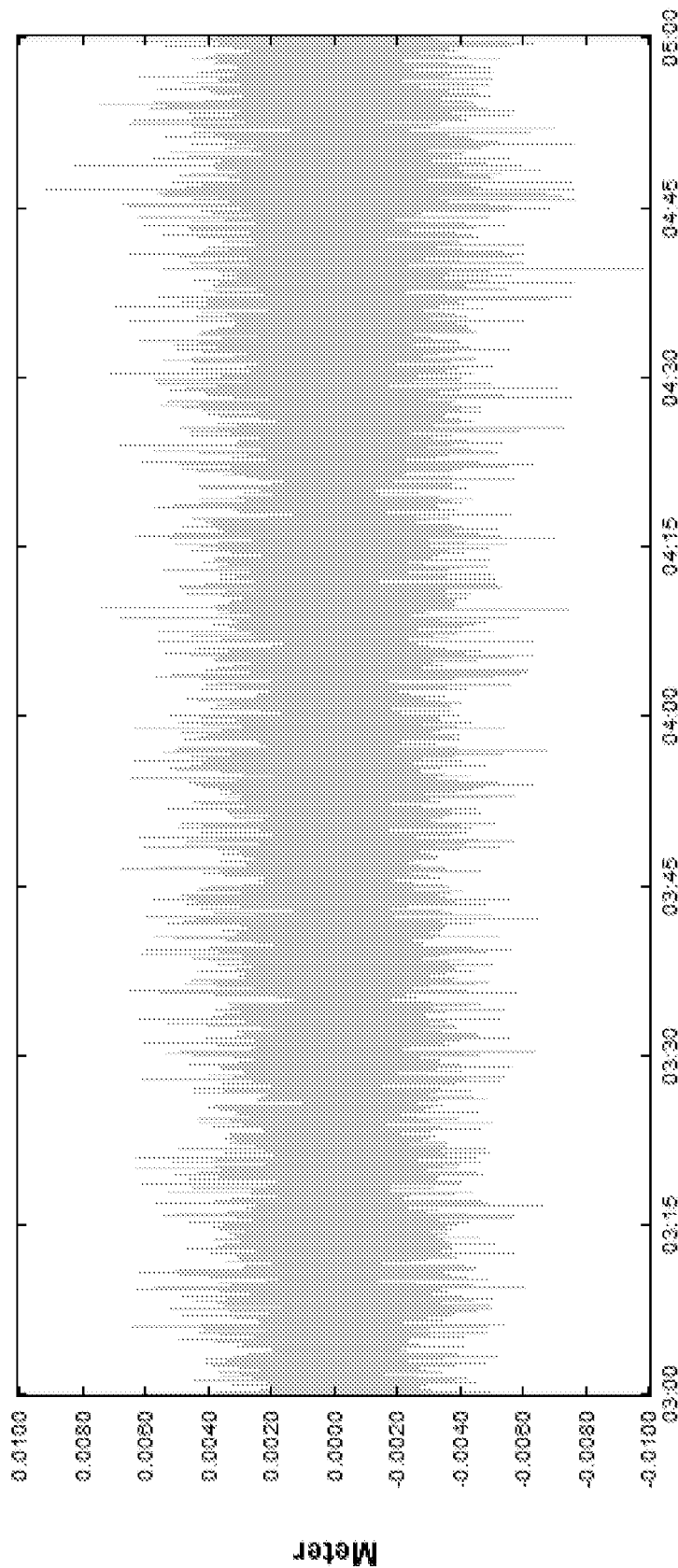
Figure 12:
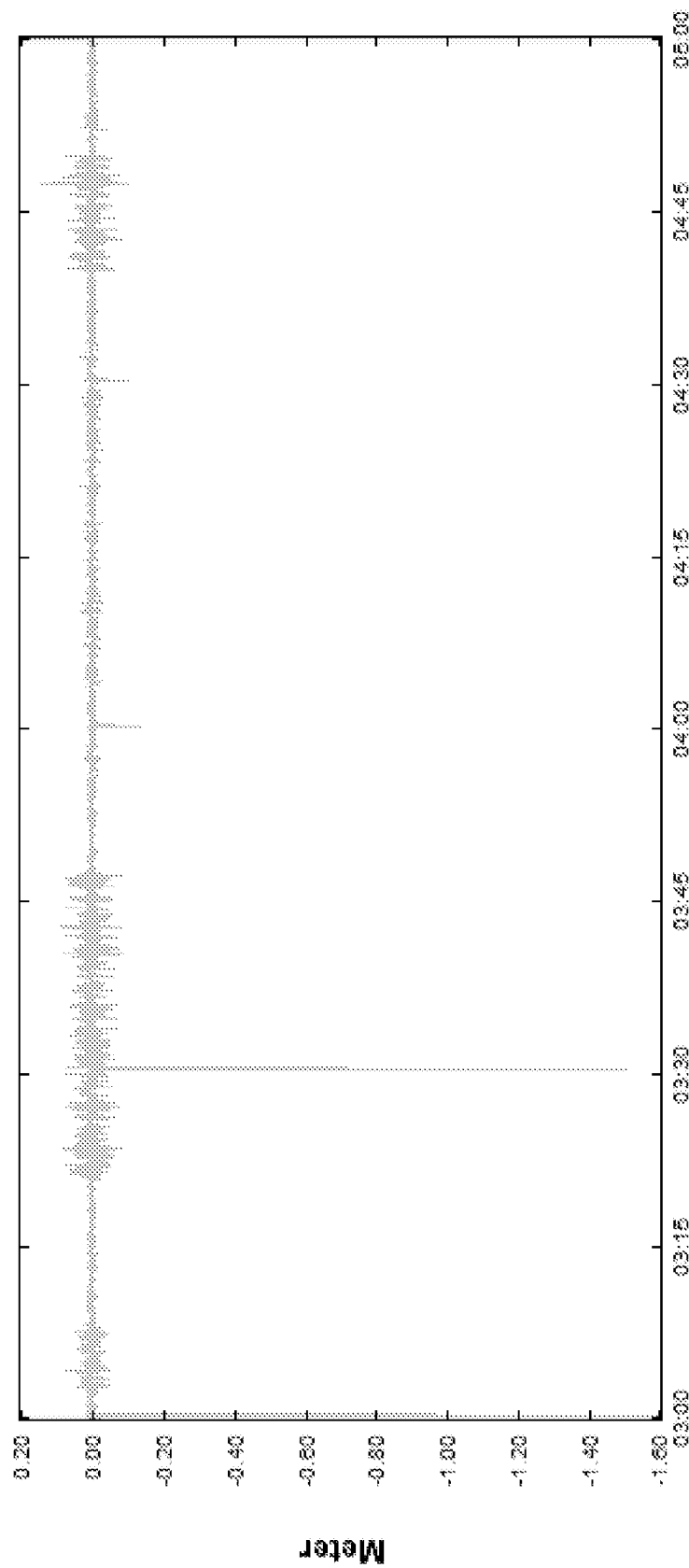
FIGS. 12, 13 and 14 show the double difference (time/space vehicle) L1 C/A, L1 P, and L2-P carrier phase time series between GLONASS-07 and GLONASS-22.
Figure 13:
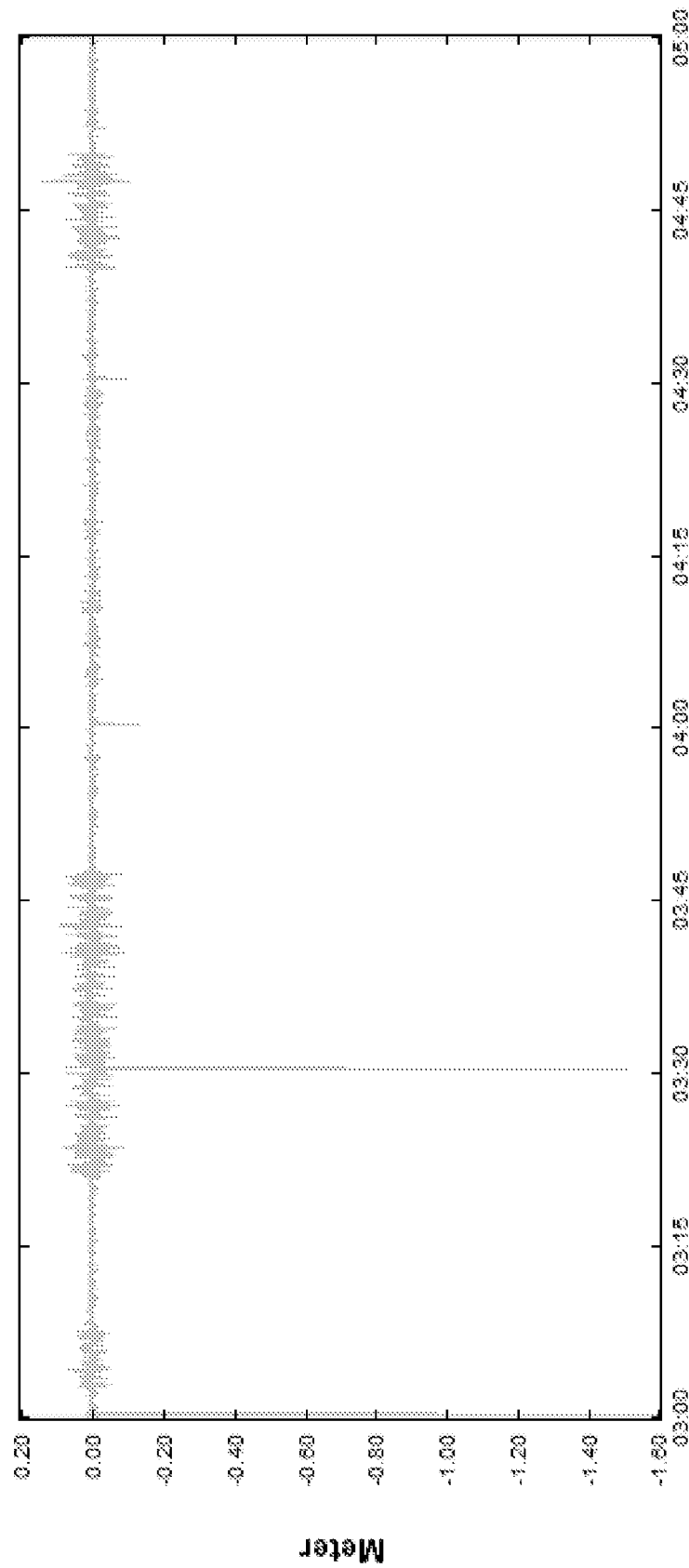
Figure 14:
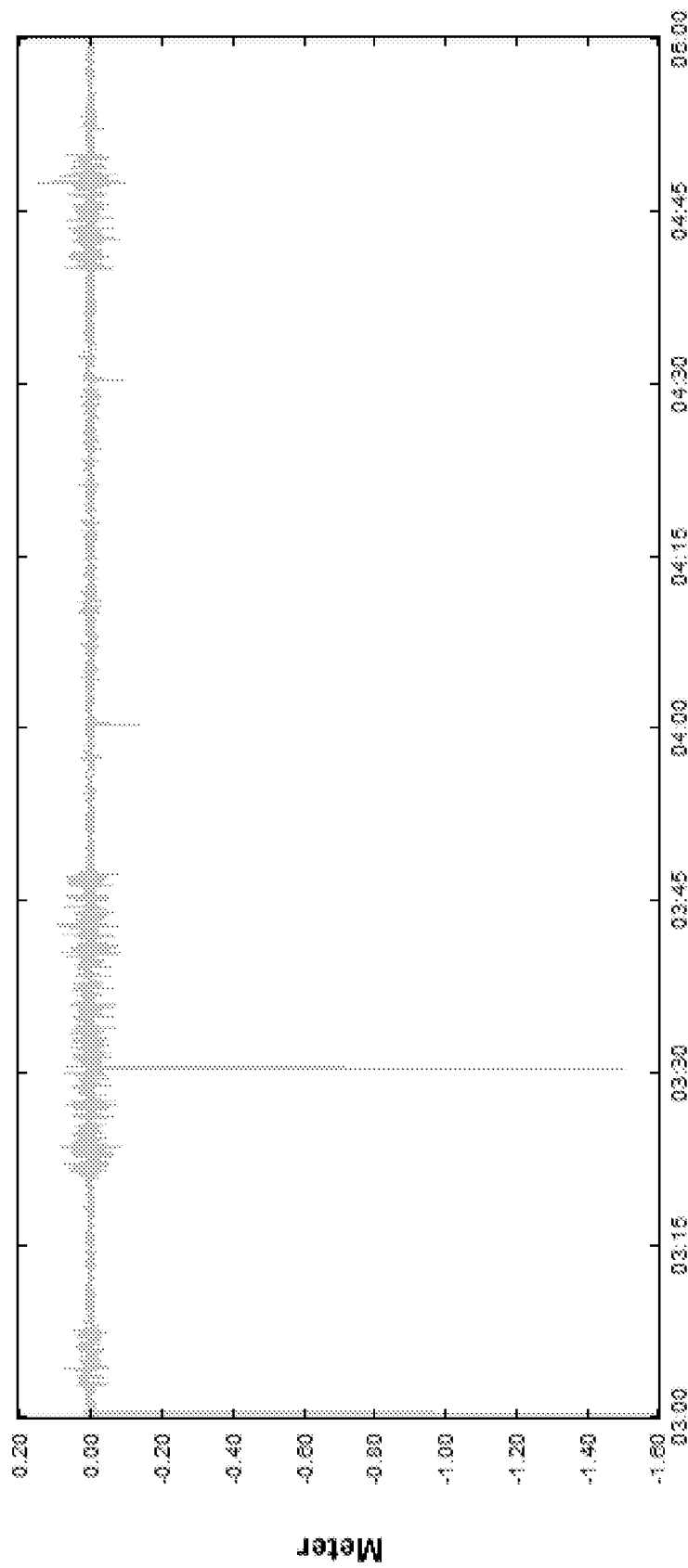
Figure 15:
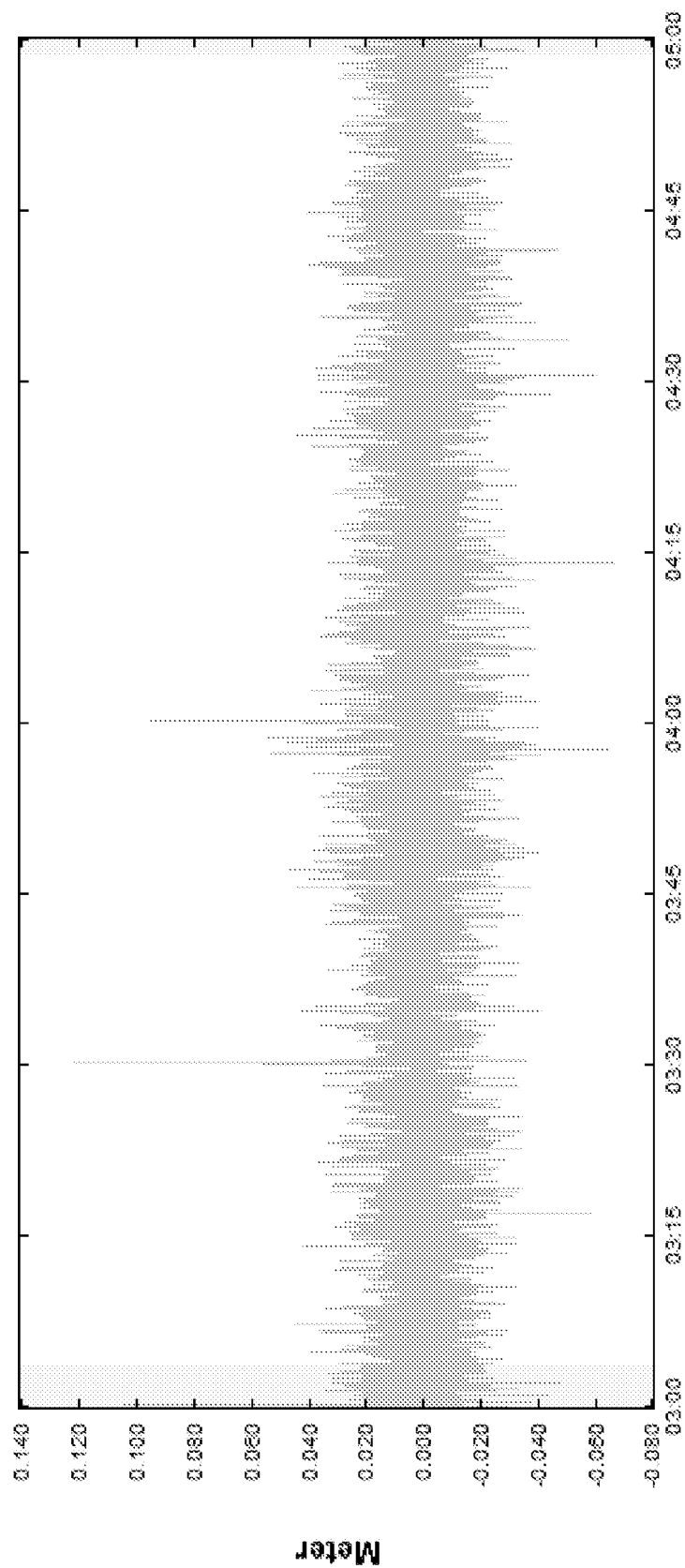
FIGS. 15, 16 and 17 show the double difference (time/station) L1 C/A, L1 P, and L2-P carrier phase time series between GLONASS-07.
Figure 16:
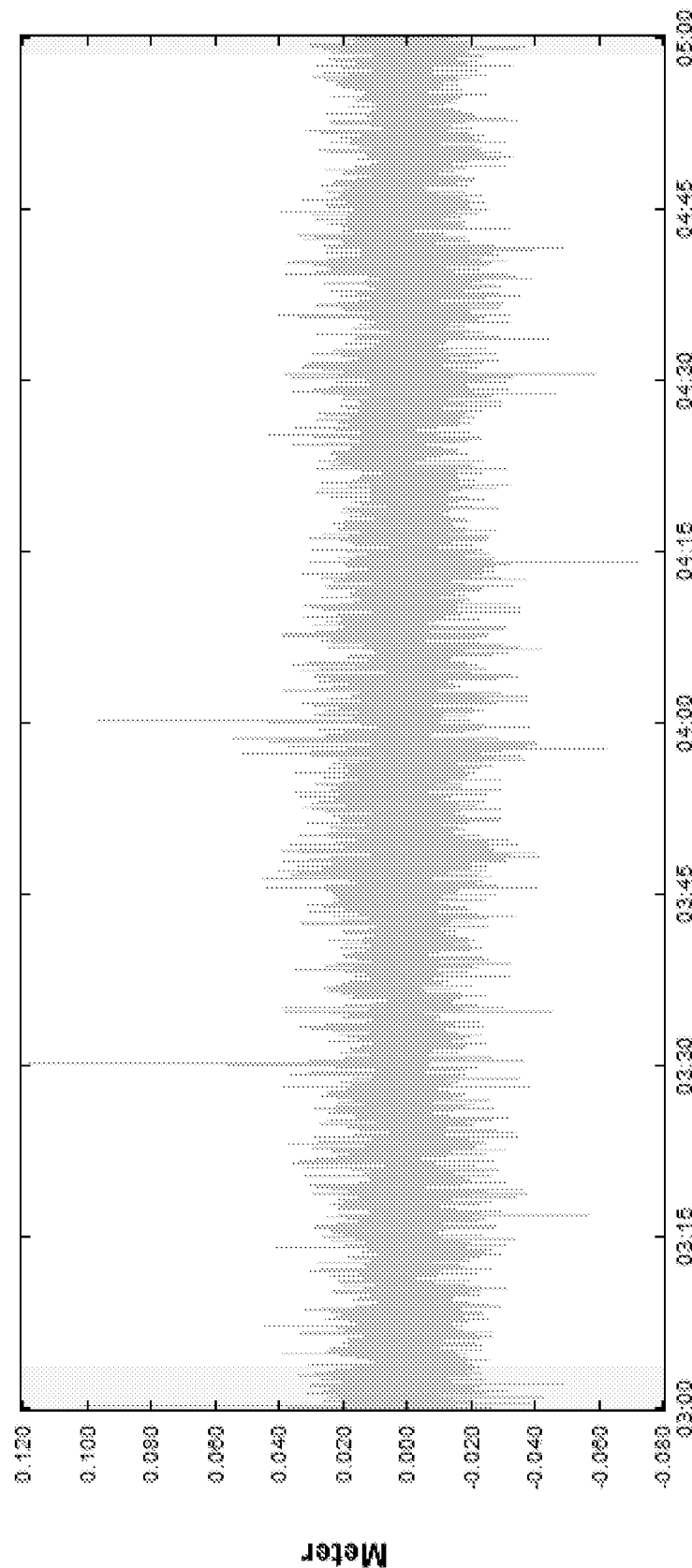
Figure 17:
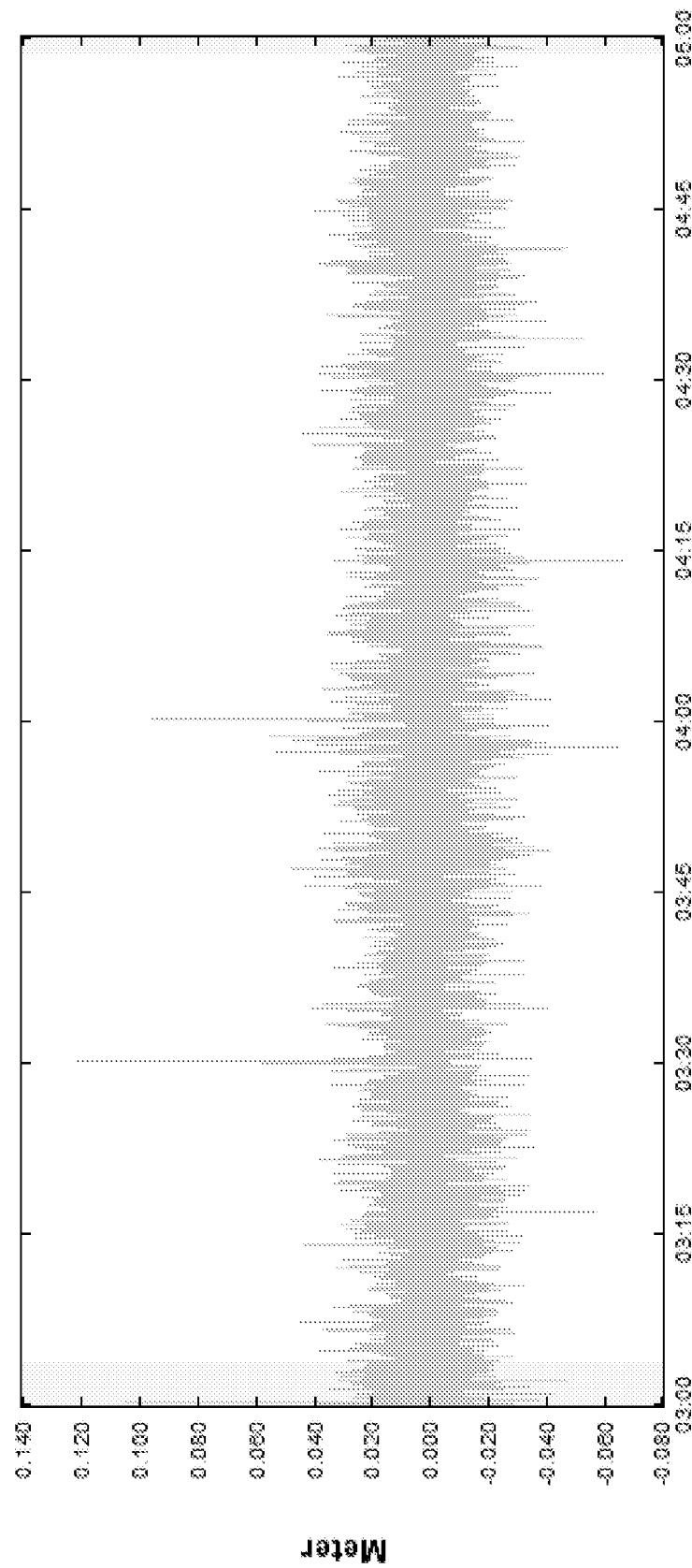

In addition to ionospheric scintillations, the other issue that can invalidate equation (8) is unexpected instabilities in the atomic frequency standard used by individual GNSS satellites. From time to time, the clocks of both GPS and GLONASS satellites appear to exhibit out-of-spec behaviour. One extreme example of this is GLONASS-07 which was flagged as unhealthy on Oct. 24, 2010. FIGS. 6, 7 and 8 contain plots of L1-C/A, L1-P, and L2-P carrier phase delta measurements for GLONASS-07 from Aug. 17, 2010. Comparing these three time series to the time series shown in FIG. 1 clearly indicates a problem with GLONASS-07 (because of the three outliers in each of FIGS. 6, 7 and 8). In this case, however, differencing of the L1-C/A and L1-P (FIG. 9), L1-C/A and L2-P (FIG. 10) or L1-P and L2-P (FIG. 11) carrier phase delta measurements indicates that the issue is not related to ionospheric disturbances but must indeed come from one of the frequency independent terms that cancel when forming differences between channels common to one satellite. Referring back to equation (5) and the discussion that followed, the most likely candidates are the receiver and satellite clock error deltas. Forming double difference (time/space vehicle) time series (equation (5) is a single difference in time for one satellite; if one subtracts a single difference in time from a second satellite, a double difference in time and satellite is obtained) between GLONASS-07 and GLONASS-22 (FIGS. 12, 13 and 14) eliminates the possibility that this is a receiver clock problem since receiver clock errors are cancelled in this combination while satellite clock errors are not. However, forming double differences between L1-C/A, L1-P and L2-P carrier phase delta measurements from two stations cancels satellite clock errors. As shown in FIGS. 15, 16 and 17, the rapid fluctuations in the carrier phase delta measurements have been eliminated and these fluctuations are therefore due to instability of the satellite clock.

In addition to ionospheric scintillation and satellite clock instabilities, errors in the receiver to satellite geometric range can result in poor performance of the simple high pass filter that is used for outlier detection and cycle slip fixing. The underlying model assumes that the reference receiver ARP is always static and the coordinates of the ARP are accurate to a few meters in the ITRF. Generally the model can tolerate errors of up to 10 meters in the receiver antenna position but it cannot handle sudden changes in the position. Similarly, the model can tolerate constant errors in satellite orbits but it cannot handle sudden changes in the position that do not fit the underlying force model. In the described raw data analysis method, satellites positions are determined either from broadcast ephemeris or from ultra-rapid precise ephemeris which is available from the International GNSS Service (IGS). According to IGS Products, 2009, Jul. 17, 2009, retrieved Jun. 26, 2011, from International GNSS Service: http://igscb.jpl.nasa.gov/components/prods.html, when GPS broadcast ephemeris is used to compute satellite positions the 1D RMS error in X, Y and Z is ~100 cm while with ultra-rapid precise ephemeris this is reduced to approximately 5 centimeters. For GLONASS satellites, it is expected that the accuracy of the broadcast ephemeris is worse by a factor of three (3) compared to GPS (Wanninger, L., & Wallstab-Freitag, S., *Combined processing of GPS, GLONASS and SBAS code phase and carrier phase measurements*, Institute of Navigation, Fort Worth, Tex.: Proceedings ION GNSS 2007, here referred to as "reference [6]").

Let us now describe in more detail some embodiments of the invention.

The current TCP system consists of a global network of more than 100 GNSS reference receivers and multiple redundant servers that compute precise GNSS satellite orbits and clocks in real-time. The expected accuracy of the positions and clock offsets are about 4 centimeters. For all tracked satellites, precise positions are transmitted from the servers over a 20 second interval while precise clock offsets are transmitted every 2 seconds. As already mentioned, shorter time intervals may be used. Using NTRIP, the precise orbits and clocks can be transmitted at 1 Hz. With these data streams, it would be possible to perform point positioning using pseudorange measurements or precise point positioning (PPP) of reference station ARPs in conjunction with the raw data analysis methods described previously. In this manner, errors in static reference station ARP coordinates could be detected or the raw data analysis method could even be extended to handle non-static GNSS receivers. Even without the addition of point positioning, the availability of TCP data streams at 1 Hz would insure more robust handling of periods of satellite clock instability, improvements in code and carrier outlier detection and more reliable cycle slip detection and fixing in general.

Single Channel Cycle Slip Detection and Combined Channel Cycle Slip Fixing (this Section May be Read with in Mind, in Particular, Step s30 in FIGS. 22-30)

Single channel cycle slip detection and combined channel cycle slip fixing is used by the raw data analysis method. As discussed above, the main problems with this approach are occasional instabilities in the GNSS satellite clocks and ionospheric scintillation. The effects of ionospheric scintillations are localized and cannot be interpolated or extrapolated from a sparse global network. However, the TCP data stream provides satellite clock offset estimates with accuracies typically better than 1 centimeter—well below the expected noise level of the satellite clock. Using the TCP data, satellite clock offset estimates rather than the clock errors predicted from the broadcast model greatly reduces the probability of erroneous detection of cycle slips and/or incorrect cycle slip fixing when using equation (4) or some derived combination.

The other problem with this approach is that it relies on precise knowledge of the positions of the receiver and satellite ARPs over the cycle slip detection/fixing interval or, more specifically, the precise delta range. In the static case, if the receiver's ARP is known to sufficient accuracy (a few meters) and precise satellite positions are available for both epochs (i.e., the epochs at the beginning and end of the interval over which a cycle slip was detected), the delta range can be considered precisely known. In the kinematic case, however, cycle slips cannot be reliably fixed without knowledge of the receiver ARP position change. If the receiver or antenna is equipped with another sensor that can be used to estimate position changes, an Inertial Measurement Unit (IMU) for example, it might then be possible to determine the delta range to sufficient accuracy. Alternatively, the ARP position change could be determined using time differenced carrier phase measurements after a preliminary cycle slip detection step. Assuming sufficient non-slipped carrier phase measurements are available across the time interval, the position change thus computed would then be used to fix any detected cycle slips.

Position Monitoring and Code Quality Assessment Using Ionospheric Free Code with Precise Orbit and Clocks (this Section May be Read with in Mind, in Particular, Step s60 in FIGS. 22-23 and FIGS. 28-29)

One possible solution for detecting errors in the static reference station ARP coordinates would be to run an autonomous solution using ionospheric free pseudorange measurements and precise satellite information. An autonomous solution may be computed for one epoch using pseudorange measurements from all satellites available for that epoch. This might also be called a navigation solution. The ionospheric free pseudorange combination can be formed, for example, using pseudorange measurements from two channels tracking L1-CIA and L2-P from the same GPS satellite.

$$P_{i_0}^j = \alpha P_{iL1CA}^j + \beta P_{iL2P}^j$$

with $\alpha = f_{L1}^2/(f_{L1}^2 - f_{L2}^2)$ and $\beta = -f_{L2}^2/(f_{L1}^2 - f_{L2}^2)$ $$P_{i_0}^j = \rho_i^{jTCP} + c\Delta t_i - c\Delta t_i^{jTCP} + T_i^j + b_{iP_0} - b_{iP_0}^j + C_i^j + m_{iP_0}^j + \epsilon_{iP_0}^j \quad (10)$$

where $P_{i_0}^j$ is the receiver to satellite j ionospheric free pseudorange at epoch i $P_{iL1CA}^j$ is the receiver to satellite j L1-C/A pseudorange at epoch i $P_{iL2P}^j$ is the receiver to satellite j L2-P pseudorange at epoch i $f_{L1}^2$ is the frequency of the GPS L1 signal (squared)

$f_{L2}^2$ is the frequency of the GPS L2 signal (squared)

$\rho_i^{jTCP}$ is the receiver to satellite j range at epoch i computed using TCP precise orbit $\Delta t_i^{jTCP}$ is the satellite j clock error at epoch i computed using TCP clock $b_{iP_0}$ is the receiver ionospheric free pseudorange bias at epoch i $b_{iP_0}^j$ is the satellite j ionospheric free pseudorange bias at epoch i $C_i^j$ is the receiver to satellite j corrections at epoch i $m_{iP_0}^j$ is the receiver to satellite j ionospheric free pseudorange multipath at epoch i $\epsilon_{iP_0}^j$ is the receiver to satellite j ionospheric free pseudorange random noise at epoch i The new term in equation (10), $C_i^j$, is a sum of corrections that can be applied to improve the accuracy of point positioning with pseudorange measurements. These include receiver and satellite antenna phase center offsets and variations and site displacements due to solid earth tides and ocean tide loading. At the very least, antenna offsets and solid earth tide displacements should be taken into account.

Figure 18:
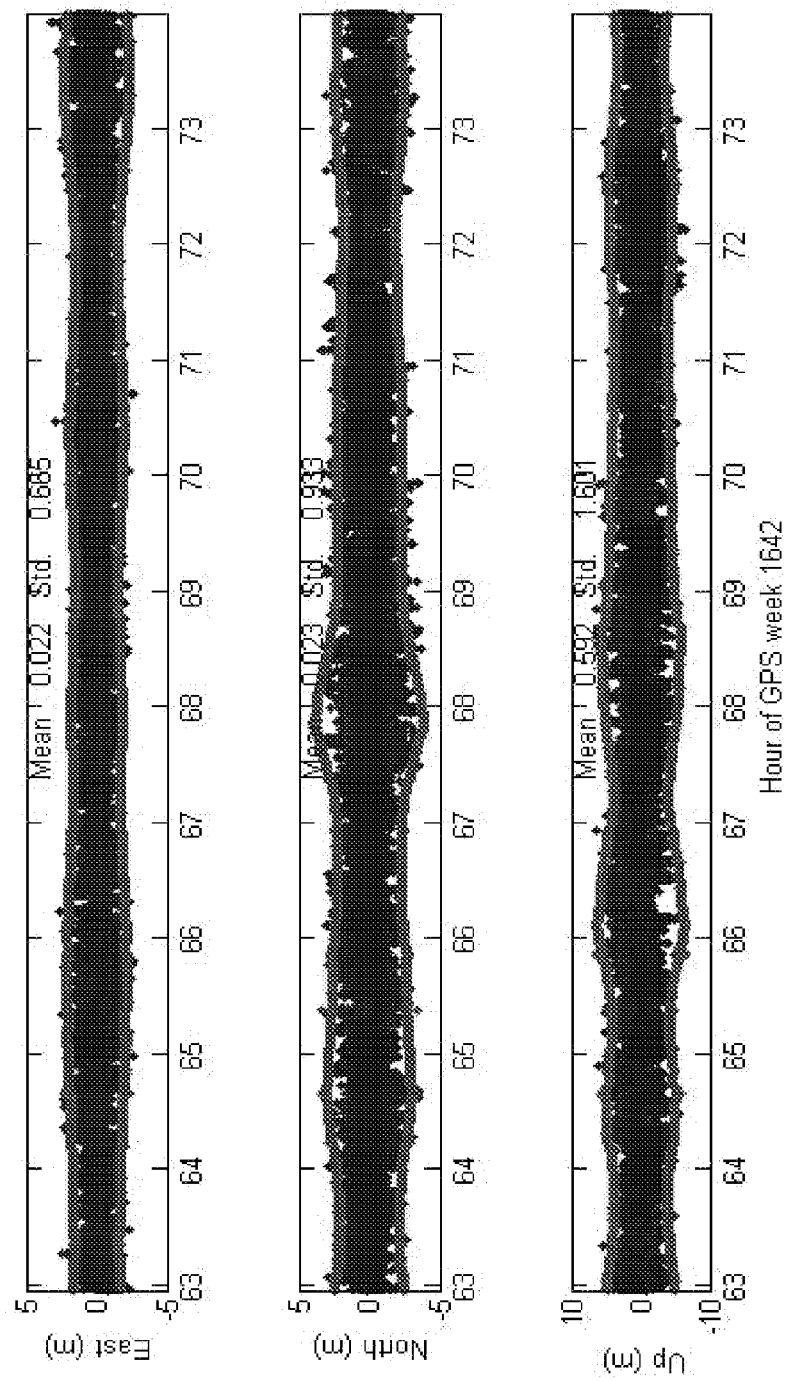
FIG. 18 shows the errors in the east, north and vertical components of the estimated position for a Trimble NetR9 receiver (i.e., a GNSS receiver) estimated using ionospheric free pseudorange measurements and precise satellite information in kinematic mode.

The TCP satellite clock errors are based on ionospheric free combinations which means that the satellite bias term, $b_{iP_0}^j$, in equation (10) can be neglected. In addition the receiver clock error, $\Delta t_i$, and receiver bias term, $b_{iP_0}$, can be lumped together into one term. Taking this into consideration yields the following mathematical model for an ionospheric free pseudorange measurement:

$$P_{i_0}^j = \rho_i^{jTCP} + c\Delta t_{ib} - c\Delta t_i^{jTCP} + T_i^j + C_i^j + m_{iP_0}^j + \epsilon_{iP_0}^j \quad (11)$$

where $\Delta t_{ib}$ is the receiver clock error and ionospheric free pseudorange bias at epoch i Assuming that it is sufficient to determine the tropospheric delay term using an empirical model such as the previously mentioned Niell model (reference [2]), then the only unknowns in equation (11) are the receiver ARP, $\rho_i^{jTCP}$ the receiver clock/bias term, $\Delta t_{ib}$, and the ionospheric free pseudorange multipath, $m_{iP_0}^j$, for each satellite. Using a Kalman filter designed to estimate the ARP and receiver clock error/bias, it should be possible to estimate the ARP coordinates to meter level accuracy using ionospheric free code and precise orbits and clocks. FIG. 18 shows the east, north and vertical errors of autonomous positions estimated by such a filter bounded by the associated standard deviations scaled by a factor of 3. When a position vector (3×1) is estimated using a filter, an associated covariance matrix (3×3) is always obtained. One can obtain the standard deviation of one component of the position vector by taking the square root of the corresponding diagonal element of the covariance matrix. This term "sigma" is synonymous with standard deviation.

Position Monitoring, Carrier Phase Quality Assessment and Cycle Slip Detection Using Ionospheric Free Carrier Phase with Precise Orbit and Clock Information (This Section May Also be Read with in Mind, in Particular, Step s60 in FIGS. 22-23 and FIGS. 28-29)

Ionospheric free carrier phase can be used in much the same way as the pseudorange to monitor reference station positions but with much higher accuracy. The ionospheric free carrier phase can be formed, for example, using carrier phase measurements from two channels tracking L1-C/A and L2-P from the same GPS satellite.

$$\Phi_{i_0}^j = \alpha \Phi_{iL1CA}^j + \beta \Phi_{iL2P}^j$$

with $\alpha = f_{L1}^2/(f_{L1}^2 - f_{L2}^2)$ and $\beta = -f_{L2}^2/(f_{L1}^2 - f_{L2}^2)$ $$\Phi_{i_0}^j = \rho_i^{jTCP} + c\Delta t_i - c\Delta t_i^{jTCP} + T_i^j + b_{i\Phi_0} - b_{i\Phi_0}^j + N_{i_0}^j + C_i^j + m_{i\Phi_0}^j + \epsilon_{i\Phi_0}^j \quad (12)$$

where $\Phi_{i0}^j$ is the receiver to satellite j ionospheric free carrier phase at epoch i $\Phi_{iL1CA}^j$ is the receiver to satellite j L1-C/A carrier phase at epoch i $\Phi_{iL2P}^j$ is the receiver to satellite j L2-P carrier phase at epoch i $b_{i\Phi_0}$ is the receiver ionospheric free carrier phase bias at epoch i $b_{i\Phi_0}^j$ is the satellite j ionospheric free carrier phase bias at epoch i $N_{i0}^j$ is the receiver to satellite j ionospheric free carrier phase ambiguity at epoch i $m_{i\Phi_0}^j$ is the receiver to satellite j ionospheric free carrier phase multipath at epoch i $\epsilon_{i\Phi_0}^j$ is the receiver to satellite j ionospheric free carrier phase random noise at epoch i As with the ionospheric free pseudorange mathematical model, the satellite bias term, $b_{i\Phi_0}^j$, in equation (12) can be neglected. In addition, the receiver clock error, $\Delta t_i$, and receiver bias term, $b_{i\Phi_0}$, can be lumped together into one term. Taking this into consideration yields the following mathematical model for an ionospheric free carrier measurement:

$$\Phi_{i0}^j = \rho_i^{jTCP} + c\Delta t_{ib} - c\Delta t_i^{jTCP} + T_i^j + N_{i0}^j + C_i^j + m_{i\Phi_0}^j + \epsilon_{i\Phi_0}^j \quad (13)$$

where $\Delta t_{ib}$ is the receiver clock error and ionospheric free carrier phase bias at epoch i For the best possible determination of the ARP height, it is usually necessary to estimate residual errors in the model used for tropospheric delay. One approach could be to replace the line-of-sight tropospheric delay term, $T_i^j$, in equation (13) with a total delay at zenith and an elevation dependent mapping function. Generally, however, the better tropospheric delay models provide wet and dry zenith delays and mapping functions for each. Since most of the error in tropospheric delay models comes from the wet component, a better approach is to estimate the residual error in the wet component of the zenith delay. Rewriting equation (13) to accommodate this approach:

$$\Phi_{i0}^j = \rho_i^{jTCP} + c\Delta t_{ib} - c\Delta t_i^{jTCP} + M_d(e_i^j)Z_{di} + M_w(e_i^j)(Z_{wi} + \Delta Z_{wi}) + N_{i0}^j + C_i^j + m_{i\Phi_0}^j + \epsilon_{i\Phi}0^j \quad (14)$$

where $M_d$ is the dry mapping function (see reference [2])

Figure 19:
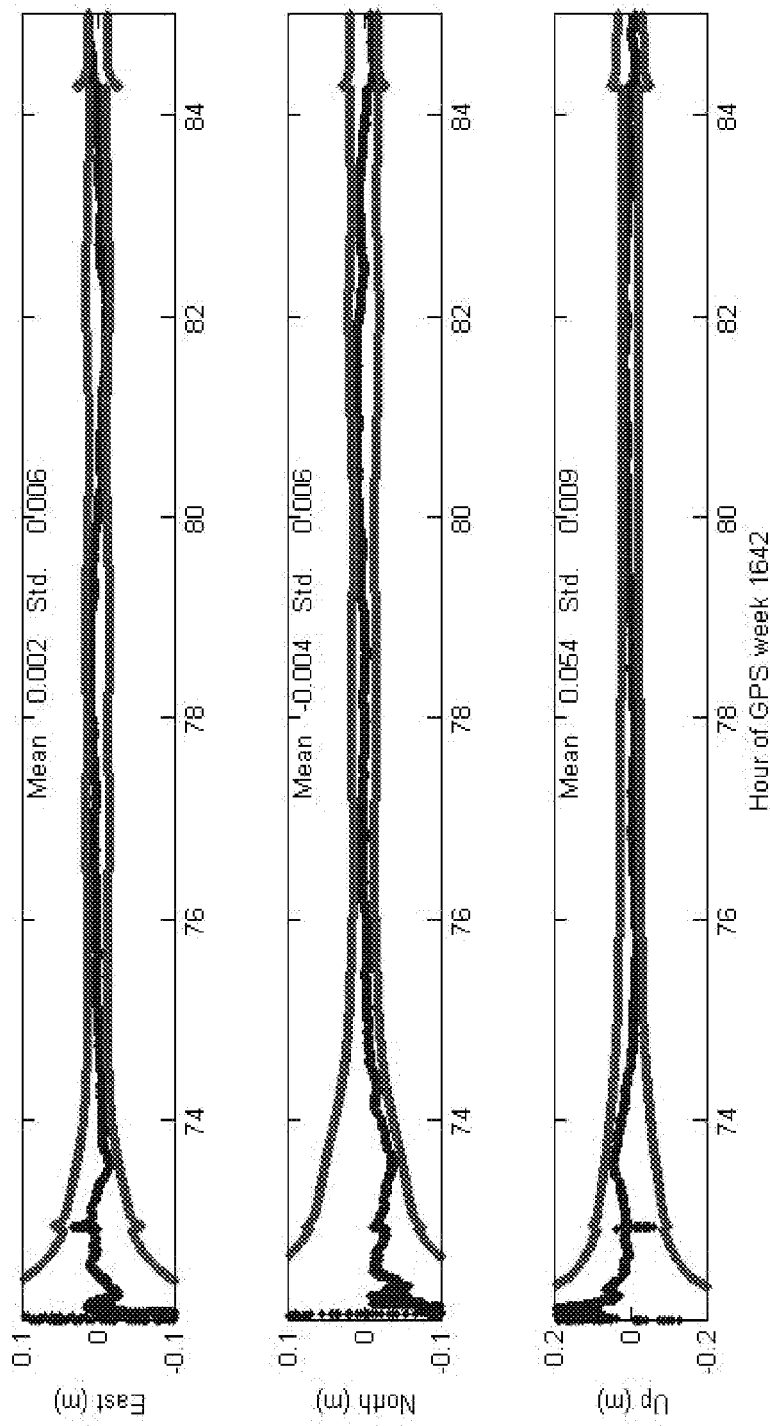
FIG. 19 shows the errors in the east, north and vertical components of the estimated position for a Trimble NetR9 receiver estimated using ionospheric free carrier phase measurements and precise satellite information in static mode.

$e_i^j$ is the receiver to satellite j elevation angle at epoch i $Z_{di}$ is the dry tropospheric delay at zenith at epoch i $M_w$ is the wet mapping function $Z_{wi}$ is the wet tropospheric delay at zenith at epoch i $\Delta Z_{wi}$ is the residual error in the wet tropospheric delay at zenith at epoch i As previously stated, the zenith delays and mapping functions are obtained from the tropospheric delay model of choice (e.g. Niell (1996), i.e. reference [2]). The unknowns in equation (14) are the receiver ARP ($\rho_i^{jTCP}$), the receiver clock/bias term ($\Delta t_{ib}$), the residual error in the wet zenith delay ($\Delta Z_{wi}$), the ionospheric free carrier phase ambiguity ($N_{i0}^j$) and ionospheric free carrier phase multipath ($m_{i\Phi_0}^j$). Using an appropriately designed Kalman filter, the ARP coordinates can easily be estimated to centimeter accuracy. However, when processing only ionospheric free carrier phase measurements, it is not possible to determine integer values for the underlying L1-C/A and L2-P ambiguities, meaning that a fixed ambiguity solution will not be possible and convergence times to centimeter accuracy will typically be slow. For reference station position monitoring, convergence time is usually only a problem if there are frequent full resets of the filter due to long communication outages or cycle slips in the measurements from all satellites. FIG. 19 shows east, north and up errors and 3 sigma error bounds for ARP coordinates estimated by a Kalman filter designed to estimate all the unknowns in equation (14). Two hours after startup, the expected 3 sigma east, north and up errors are 19, 38 and 54 millimeters, respectively. Four hours after startup, the expected 3 sigma errors have dropped to 14, 15 and 28 millimeters, respectively.

Narrow Lane Code Multipath Monitoring and Wide Lane Carrier Phase Cycle Slip Detection (this Section May be Read with in Mind, in Particular, Step s30 in FIGS. 22-30)

In addition to precise satellite orbits and clocks, the TCP data stream also contains pseudorange biases for each satellite. These can be used in conjunction with the well-known Melbourne-Wubbena (Melbourne, W. (1985). The case for ranging in GPS based geodetic systems. Proceedings of 1st International Symposium on Precise Positioning with the Global Positioning System. Rockville, Md.: U.S. Department of Commerce, here referred to as reference [7]) pseudorange/carrier phase combination to estimate wide lane carrier phase ambiguities, detect narrow lane code outliers and multipath and to detect wide lane carrier phase cycle slips. Narrow lane code combinations can be formed, for example, using GPS L1-C/A and GPS L2-P pseudorange measurements as follows:

$$P_{ie}^j = \rho_i^j + c\Delta t_i - c\Delta t_i^j + T_i^j + I_{iP_e}^j + b_{iP_e} - b_{iP_e}^j + m_{iP_e}^j + \epsilon_{iP_e}^j \quad (15)$$

where $P_{ie}^j = P_{iL1CA}^j + P_{iL2P}^j$ is the receiver to satellite j narrow lane code observation at epoch i $I_{iP_e}^j = I_{iP_{L1}}^j + I_{iP_{L2}}^j$ is the receiver to satellite j narrow lane code ionospheric delay at epoch i $b_{iP_e} = b_{iP_{L1CA}} + b_{iP_{L2P}}$ is the receiver narrow lane code bias at epoch i $b_{iP_e}^j = b_{iP_{L1CA}}^j + b_{iP_{L2P}}^j$ is the satellite j narrow lane code bias at epoch i $m_{iP_e}^j$ is the receiver to satellite j narrow lane code multipath at epoch i $\epsilon_{iP_e}^j$ is the receiver to satellite j narrow lane code random noise term at epoch i Wide lane carrier phase combinations can be formed, for example, using GPS L1-C/A and GPS L2-P carrier phase measurements as follows:

$$\Phi_{i\Delta}^j = \rho_i^j + c\Delta t_i - c\Delta t_i^j + T_i^j + I_{i\Phi_\Delta}^j + b_{i\Phi_\Delta} - b_{i\Phi_\Delta}^j + \lambda_\Delta N_{i\Delta}^j + m_{i\Phi_\Delta}^j + \epsilon_{i\Phi_\Delta}^j \quad (16)$$

where $\Phi_{i\Delta}^j = \lambda_\Delta(\Phi_{iL1CA}^j - \Phi_{iL2P}^j)$ is the receiver to satellite j wide lane carrier phase observation at epoch i $\lambda_\Delta = (1/\lambda_{L1} - 1/\lambda_{L2})$ is the wide lane wavelength (~0.862 meters for GPS)

$$I_{i\Phi_\Delta}^j = \lambda_\Delta \left( \frac{I_{i\Phi_{L1}}^j}{\lambda_{L1}} - \frac{I_{i\Phi_{L2}}^j}{\lambda_{L2}} \right)$$

is the receiver to satellite j wide lane carrier phase ionospheric delay at epoch i $$b_{i\Phi_\Delta} = \lambda_\Delta \left( \frac{I_{i\Phi_{L1}}^j}{\lambda_{L1}} - \frac{I_{i\Phi_{L2}}^j}{\lambda_{L2}} \right)$$

is the receiver wide lane carrier phase bias at epoch i $$b^j_{i\Phi_\Delta} = \lambda_\Delta \left( \frac{b_{i\Phi_{L1CA}}}{\lambda_{L1}} - \frac{b_{i\Phi_{L2P}}}{\lambda_{L2}} \right)$$

is the satellite j wide lane carrier phase bias at epoch i
$N_{i\Delta}^j = N_{iL1CA}^j - N_{iL2P}^j$ is the receiver to satellite j wide lane carrier phase ambiguity at epoch i
$m_{i\Phi_\Delta}^j$ is the receiver to satellite j wide lane carrier phase multipath at epoch i
$\epsilon_{i\Phi_\Delta}^j$ is the receiver to satellite j wide lane carrier phase random noise term at epoch i The Melbourne-Wubbena combination is formed by subtracting the narrow lane code combination from the wide lane carrier phase combination. A particularly useful feature of this combination is that the wide lane carrier phase ionospheric delay is the same as the narrow lane code ionospheric delay and therefore cancels. This is also true of the geometric range, clock errors and tropospheric delay leading to equation (17).

$$\theta_{i\Delta e}^j = \lambda_\Delta N_{i\Delta}^j + (b_{1\Phi_\Delta} - b_{iP_e}) - (b_{i\Phi_\Delta}^j - b_{iP_e}^j) + m_{i\theta_{\Delta e}}^j + \epsilon_{i\theta_{\Delta e}}^j \quad (17)$$

where
$\theta_{i\Delta e}^j = \Phi_{i\Delta}^j - P_{i\epsilon}^j$ is the receiver to satellite j wide lane carrier phase-narrow lane code at epoch i
$m_{i\theta_{\Delta e}}^j$ is the receiver to satellite j wide lane carrier phase-narrow lane code multipath at epoch i
$\Delta_{i\theta_{\Delta e}}^j$ is the receiver to satellite j wide lane carrier phase/narrow lane code noise at epoch i The pseudorange bias for each satellite that is included in the TCP data stream is actually the difference between the wide lane carrier phase and narrow lane code bias. Combining the wide lane carrier phase and narrow lane code bias terms yields the following mathematical model:

$$\theta_{i\Delta e}^j = \lambda_\Delta N_{i\Delta}^j + b_{i\theta_{\Delta e}}^j - b_{i\theta_{\Delta e}}^{jTCP} + m_{i\theta_{\Delta e}}^j + \epsilon_{i\theta_{\Delta e}}^j \quad (18)$$

where
$b_{i\theta_{\Delta e}}$ is the receiver wide lane carrier phase/narrow lane code bias at epoch i
$b_{i\theta_{\Delta e}}^{jTCP}$ is the TCP estimate of satellite j wide lane carrier phase/narrow lane code bias at epoch i The unknowns in equation (18) are the wide lane carrier phase ambiguity, the combined receiver bias and the combined multipath. One approach to estimating the unknowns could be to use an appropriately designed Kalman filter that simultaneously estimates the receiver bias and ambiguities and multipath for all tracked satellites. The drawback of this approach is the rather large state vector with a size given by 1+2N, where N is the number of tracked satellites. Alternatively, the receiver bias could be eliminated by forming single differences between two satellites thus restoring the integer nature of the wide lane ambiguity. Using this approach, the Melbourne-Wubbena observations from each satellite could be processed separately using appropriately designed two state Kalman filters to estimate the single difference ambiguity and multipath.

Figure 20:
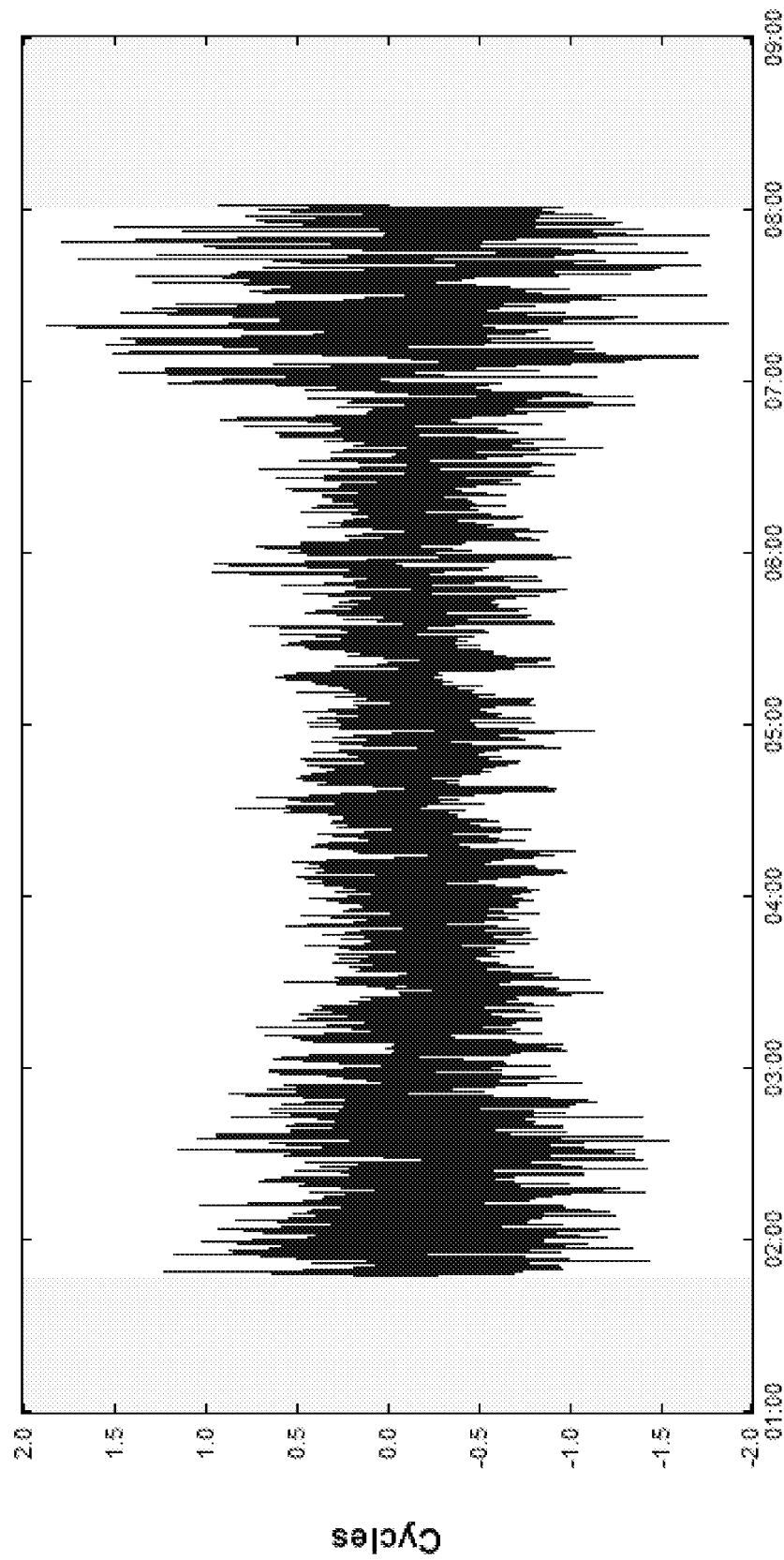
FIGS. 20 and 21 contain sample plots of the Melbourne-Wubbena observation combination from GPS-11 and GLONASS-01.
Figure 21:
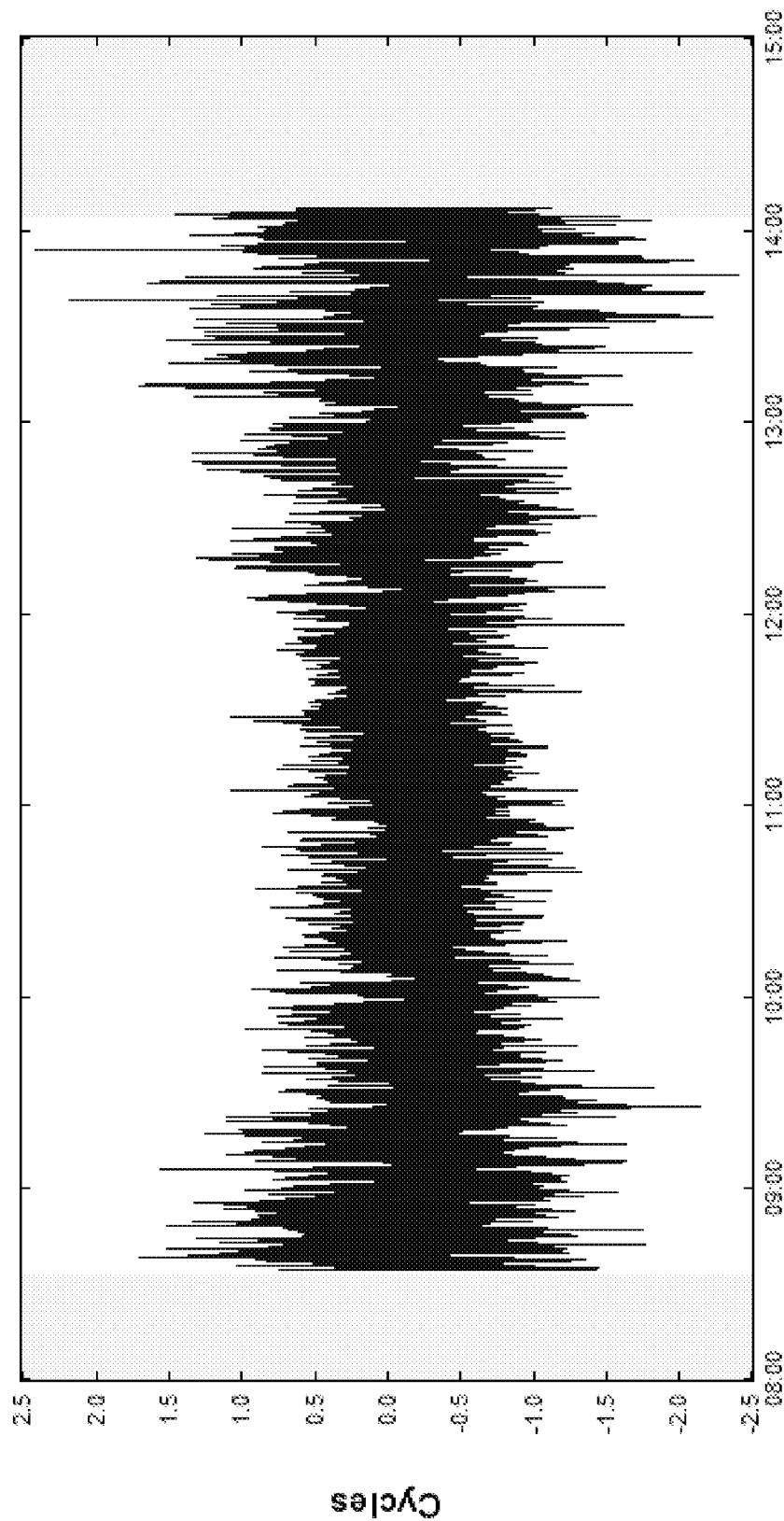
Figure 22:
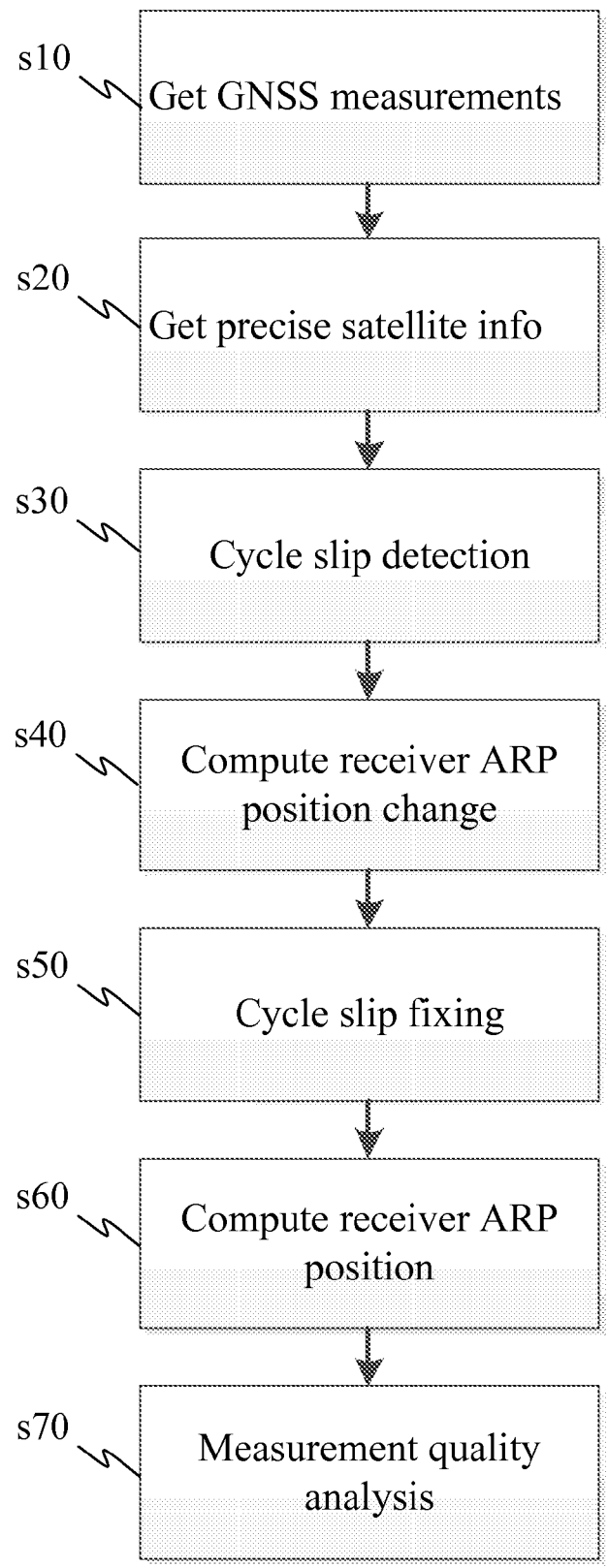
FIG. 22 is a flowchart of a method in one embodiment of the invention, including a measurement quality analysis step.
Figure 23:
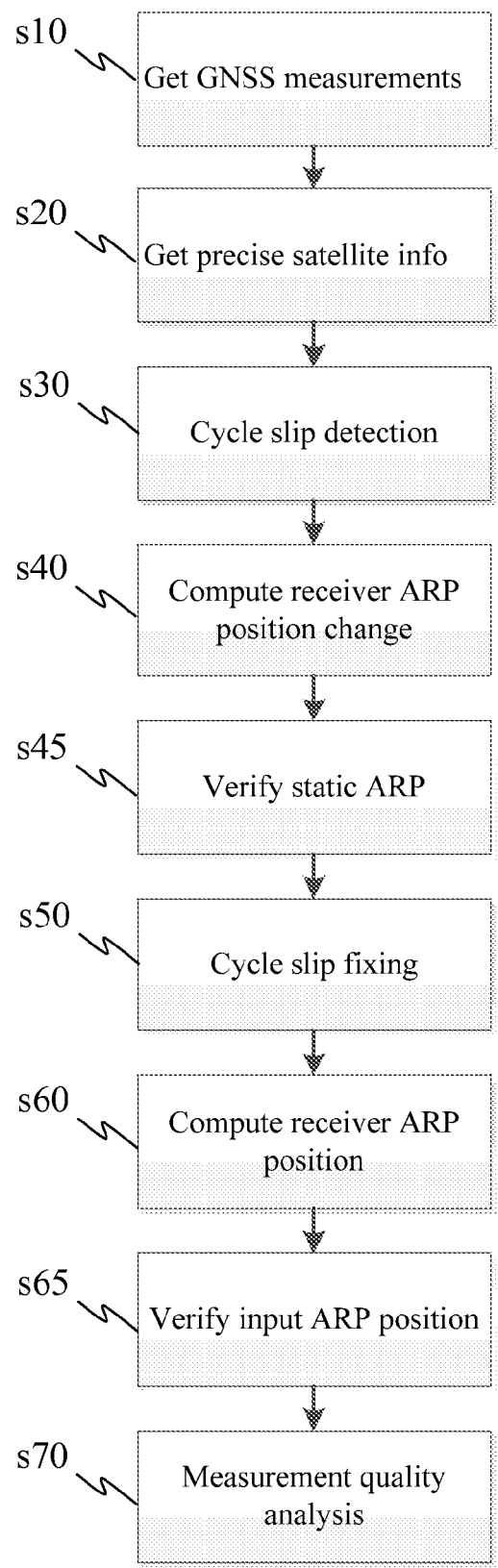
FIG. 23 is a flowchart of a method in one embodiment of the invention, including a step of verifying the input antenna reference position (ARP) and a measurement quality analysis step.

If float estimates of the wide lane ambiguities are sufficient, the wide lane ambiguity and receiver bias can be combined into one unknown and equation (18) re-written as follows:

$$\theta_{i\Delta e}^j = N_{i\Delta}^j - b_{i\theta_{\Delta e}}^{jTCP} + m_{i\theta_{\Delta e}}^j + \epsilon_{i\theta_{\Delta e}}^j \quad (19)$$

where
$N_{i\Delta}^j = \lambda_\Delta N_{i\Delta}^j + b_{i\theta_{\Delta e}}$ is the receiver to satellite j wide lane carrier phase float ambiguity at epoch i The unknowns in equation (19) are the combined wide lane ambiguity/receiver bias and multipath. Appropriately designed Kalman filters can be used to estimate these two states for each satellite. Although integer values cannot be resolved for the absolute wide lane ambiguities, changes in the float wide lane ambiguities (cycle slips) over relatively long time intervals should be near integer since the receiver bias generally has a long time constant. FIGS. 20 and 21 contain sample plots of the Melbourne-Wubbena observation combination from GPS-11 and GLONASS-01.

Mechanization

By forming various geometry free measurement combinations it is possible to detect cycle slips in the carrier phase measurements from a static or roving GNSS receiver. The Melbourne-Wubenna combination (equation (17)) and ionospheric residual combination (equation (9)) are particularly useful for this purpose. For a roving GNSS receiver it is difficult to determine integer cycle slip value and position change at the same time. Assuming there are sufficient cycle slip free satellites, however, it is possible to determine the change in the rover position using time differenced carrier phase (equation (5)) using only the cycle slip free satellites. Once the change in rover position has been determined integer cycle slip values can be determined for the remaining satellites using equation (8) and the previously described methods. Next, if required, the change in the rover position change can be re-computed using all available satellites. Alternatively, the absolute rover position can be computed using ionospheric free code (equation (11)) and carrier phase (equation (13)). For each epoch, a mechanization in one embodiment for the general case of a static or kinematic receiver/antenna is as follows (FIG. 22):

Get epoch GNSS measurements from all channels (step s10);
Get precise satellite position and clock offsets (step s20);
Detect cycle slips using geometry free carrier phase and code-carrier combinations (e.g. ionospheric residual carrier phase (equation (9)), Melbourne-Wubbena code-carrier (equation (17))) (step s30);
Compute receiver ARP position change from the previous epoch using time differenced carrier phase (equation (5)) from cycle slip free satellites (step s40);
Attempt single channel cycle slip fixing (step s50);
Compute receiver ARP position and clock offsets using ionospheric free code (equation 11) and carrier phase measurements (equation 13) (step s60);
Quality analysis of code and carrier phase measurements. See for example Baarda, W. (1968) "A testing procedure for use in geodetic network", Publications on Geodesy (Vol. 2 Nr. 5), Leppakoski, H, Kuueniemi, H, and Takala, J, 2006, "RAIM and complementary Kalman filtering for GNSS Realiability Enhancement", Tempere University of Technology, Finland (step s70);

A mechanization in one embodiment for a static receiver/antenna is as follows (FIG. 23):
Get epoch GNSS measurements from all channels (step s10);
Get precise satellite position and clock offsets (step s20);
Single channel cycle slip detection (step s30);
Compute receiver ARP position change from the previous epoch using time differenced carrier phase from cycle slip free satellites (step s40);
Verify static ARP (step s45) (This may also be done as an outlier detection process. The hypothesis is that the receiver did not move and the computed change in position would be tested against that hypothesis);
Attempt single channel cycle slip fixing (step s50);
Compute receiver ARP position and clock offsets using ionospheric free code and carrier phase measurements (step s60);

Verify input ARP position (step s65);

Quality analysis of code and carrier phase measurements (step s70);

Any of the above-described methods and their embodiments may be implemented by means of a computer program. The computer program may be loaded on an apparatus, a rover, a receiver or a network station as described above. Therefore, the invention also relates to a computer program, which, when carried out on an apparatus, a rover, a receiver or a network station as described above, carries out any one of the above above-described methods and their embodiments.

The invention also relates to a computer-readable medium or a computer-program product including the above-mentioned computer program. The computer-readable medium or computer-program product may for instance be a magnetic tape, an optical memory disk, a magnetic disk, a magneto-optical disk, a CD ROM, a CD, a DVD, a BD, a flash memory unit or the like, wherein the computer program is permanently or temporarily stored. The invention also relates to a computer-readable medium (or to a computer-program product) having computer-executable instructions for carrying out any one of the methods of the invention.

The invention also relates to a firmware update adapted to be installed on receivers already in the field, i.e. a computer program which is delivered to the field as a computer program product. This applies to each of the above-described methods and apparatuses.

GNSS receivers may include an antenna, configured to receive the signals at the frequencies broadcasted by the satellites, RF (radio frequency) modules (for signal selection, amplification and detection), processor units, one or more accurate clocks (such as crystal oscillators), one or more computer processing units (CPU), one or more memory units (RAM, ROM, flash memory, or the like), and a display for displaying position information to a user.

Where the terms "receiver", "filter", "processing element" or the like are used herein as units of an apparatus, no restriction is made regarding how distributed the constituent parts of a unit may be. That is, the constituent parts of a unit may be distributed in different software or hardware components or devices for bringing about the intended function. Furthermore, the units may be gathered together for performing their functions by means of a combined, single unit. For instance, the receiver, the filter and the processing element may be combined to form a single unit, to perform the combined functionalities of the units.

The above-mentioned units may be implemented using hardware, software, a combination of hardware and software, pre-programmed ASICs (application-specific integrated circuit), etc. A unit may include a computer processing unit (CPU), a storage unit, input/output (I/O) units, network connection units, etc.

Although the present invention has been described on the basis of detailed examples, the detailed examples only serve to provide the skilled person with a better understanding, and are not intended to limit the scope of the invention. The scope of the invention is much rather defined by the appended claims.

The invention claimed is:

1. Method for estimating parameters for determining the position of a global navigation satellite system (GNSS) receiver or a change in the position of the GNSS receiver, the method including the steps of:

obtaining, using a processing unit, information from at least one GNSS signal received at the GNSS receiver from each of a plurality of GNSS satellites;

obtaining, using a communication interface, information on the plurality of GNSS satellites from at least one network node, here referred to as "precise satellite information", the precise satellite information obtained at a frequency of 1 Hz or more frequently, the precise satellite information including:

(i) the orbit or position of at least one of the plurality of GNSS satellites, and (ii) a clock offset of at least one of the plurality of GNSS satellites;

identifying, using the processing unit, a subset of at least one GNSS signal affected by a cycle slip from the obtained GNSS signals, the identified subset being hereinafter referred to as cycle-slip affected subset; and estimating, using the processing unit, the parameters for determining the position of the GNSS receiver or a change in the position of the GNSS receiver using at least some of the obtained GNSS signals which are not in the cycle-slip affected subset, and the precise satellite information.

2. Method of claim 1, wherein the step of obtaining precise satellite information further includes obtaining information on (iii) biases between the phase of two or more GNSS signals originating from one satellite, for at least one of the plurality of GNSS satellites.

3. Method of claim 1, wherein the step of obtaining at least one GNSS signal from each of a plurality of GNSS satellites includes making ranging code observations and carrier phase observations of the GNSS signals.

4. Method of claim 1, wherein the step of obtaining, from at least one network node, precise satellite information includes:

obtaining the information per GNSS satellite at a frequency of 2 Hz or more frequently.

5. Method of claim 1, wherein the step of identifying the cycle-slip affected subset includes detecting cycle slips using at least one of geometry-free carrier phase combinations and geometry-free code-carrier combinations.

6. Method of claim 5, wherein detecting cycle slips using geometry free carrier phase and code-carrier combinations includes computing geometry-free ionospheric residual carrier phases.

7. Method of claim 5, wherein detecting cycle slips using geometry free carrier phase and code-carrier combinations includes computing geometry-free Melbourne-Wubbena code-carriers.

8. Method of claim 5, wherein the step of identifying the cycle-slip affected subset makes use of the obtained precise satellite information.

9. Method of claim 1, wherein the step of estimating the parameters for determining the position of the GNSS receiver or a change in the position of the GNSS receiver includes determining a position change of the receiver using time-differenced carrier phase for at least some of the obtained GNSS signals which are not in the cycle-slip affected subset.

10. Method of claim 1, wherein the step of estimating the parameters for determining the position of the GNSS receiver or a change in the position of the GNSS receiver makes use of:

at least some of the obtained GNSS signals which are not in the cycle-slip affected subset and which are not originating from a satellite having a clock offset or drift exceeding a threshold based on the specification for the satellite's atomic clock stability; and
the obtained precise satellite information.

11. Method of claim 1, wherein the step of estimating the parameters for determining the position of the GNSS receiver or a change in the position of the GNSS receiver makes use of:
at least some of the obtained GNSS signals which are not in the cycle-slip affected subset and which are not originating from a satellite that has an abnormal clock offset in the sense that an attempt to compute the clock offset using the broadcast clock parameters results in a residual clock error, when compared to a clock offset computed using the precise satellite information, where said residual clock error exceeds a threshold; and
the obtained precise satellite information.

12. Method of claim 1, wherein the method further includes the steps of:
performing cycle slip fixing on the GNSS signals of the cycle-slip affected subset; and
estimating again the parameters for determining the position of the GNSS receiver or a change in the position of the GNSS receiver as well as the clock offset of the GNSS receiver by using:
at least some of the obtained GNSS signals including at least one GNSS signal of the cycle-slip affected subset for which cycle slip fixing has been performed; and
the obtained precise satellite information.

13. Method of claim 12, wherein the step of estimating again the parameters for determining the position of the GNSS receiver or a change in the position of the GNSS receiver as well as the clock offset of the GNSS receiver makes use of
ionospheric free code combination and ionospheric free carrier phase combination.

14. Method of claim 12, wherein the step of estimating again the parameters for determining the position of the GNSS receiver or a change in the position of the GNSS receiver as well as the clock offset of the GNSS receiver makes use of:
at least some of the obtained GNSS signals including at least one GNSS signal of the cycle-slip affected subset for which cycle slip fixing has been performed, but not including GNSS signals originating from a satellite having a clock offset or drift exceeding a threshold based on the specification for the satellite's atomic clock stability; and
the obtained precise satellite information.

15. Method of claim 12, wherein the step of estimating again the parameters for determining the position of the GNSS receiver or a change in the position of the GNSS receiver as well as the clock offset of the GNSS receiver makes use of:
at least some of the obtained GNSS signals including at least one GNSS signal of the cycle-slip affected subset for which cycle slip fixing has been performed, but not including GNSS signals originating from a satellite that has an abnormal clock offset in the sense that an attempt to compute the clock offset using the broadcast clock parameters results in a residual clock error, when compared to a clock offset computed using the precise satellite information, where said residual clock error exceeds a threshold; and
the obtained precise satellite information.

16. Apparatus for estimating parameters for determining the position of a global navigation satellite system (GNSS) receiver or a change in the position of the GNSS receiver, the apparatus comprising:
a processing unit configured for receiving information from at least one GNSS signal received at the GNSS receiver from each of a plurality of GNSS satellites; and
a communication interface configured for obtaining, from at least one network node, information on the plurality of GNSS satellites, here referred to as "precise satellite information", the precise satellite information obtained at a frequency of 1 Hz or more frequently, the precise satellite information including:
(i) the orbit or position of at least one of the plurality of GNSS satellites, and
(ii) a clock offset of at least one of the plurality of GNSS satellites;
the processing unit also configured for:
identifying, among the obtained GNSS signals, a subset of at least one GNSS signal affected by a cycle slip, the identified subset being hereinafter referred to as cycle-slip affected subset; and
estimating the parameters for determining the position of the GNSS receiver or a change in the position of the GNSS receiver using
at least some of the obtained GNSS signals which are not in the cycle-slip affected subset, and
the precise satellite information.

17. Apparatus of claim 16, further configured so that obtaining precise satellite information further includes obtaining information on
(iii) biases between the phase of two or more GNSS signals originating from one satellite, for at least one of the plurality of GNSS satellites.

18. Apparatus of claim 16, further configured so that receiving information from at least one GNSS signal from each of a plurality of GNSS satellites includes
making ranging code observations and carrier phase observations of the GNSS signals.

19. Apparatus of claim 16, further configured so that obtaining, from at least one network node, precise satellite information includes:
obtaining the information per GNSS satellite at a frequency of 2 Hz or more frequently.

20. Apparatus of claim 16, further configured so that identifying the cycle-slip affected subset includes
detecting cycle slips using at least one of geometry-free carrier phase combinations and geometry-free code-carrier combinations.

21. Apparatus of claim 20, further configured so that detecting cycle slips using geometry free carrier phase and code-carrier combinations includes
computing geometry-free ionospheric residual carrier phases.

22. Apparatus of claim 20, further configured so that detecting cycle slips using geometry free carrier phase and code-carrier combinations includes
computing geometry-free Melbourne-Wubbena code-carriers.

23. Apparatus of claim 20, further configured so that identifying the cycle-slip affected subset makes use of
the obtained precise satellite information.

24. Apparatus of claim 16, further configured so that estimating the parameters for determining the position of the GNSS receiver or a change in the position of the GNSS receiver includes determining a position change of the receiver using time-differenced carrier phase for at least some of the obtained GNSS signals which are not in the cycle-slip affected subset.

25. Apparatus of claim 16, further configured so that estimating the parameters for determining the position of the GNSS receiver or a change in the position of the GNSS receiver makes use of:
at least some of the obtained GNSS signals which are not in the cycle-slip affected subset and which are not originating from a satellite having a clock offset or drift exceeding a threshold based on the specification for the satellite's atomic clock stability; and
the obtained precise satellite information.

26. Apparatus of claim 16, further configured so that estimating the parameters for determining the position of the GNSS receiver or a change in the position of the GNSS receiver makes use of:
at least some of the obtained GNSS signals which are not in the cycle-slip affected subset and which are not originating from a satellite that has an abnormal clock offset in the sense that an attempt to compute the clock offset using the broadcast clock parameters results in a residual clock error, when compared to a clock offset computed using the precise satellite information, where said residual clock error exceeds a threshold; and
the obtained precise satellite information.

27. Apparatus of claim 16, further configured for:
performing cycle slip fixing on the GNSS signals of the cycle-slip affected subset; and
estimating again the parameters for determining the position of the GNSS receiver or a change in the position of the GNSS receiver as well as the clock offset of the GNSS receiver by using:
at least some of the obtained GNSS signals including at least one GNSS signal of the cycle-slip affected subset for which cycle slip fixing has been performed; and
the obtained precise satellite information.

28. Apparatus of claim 17, further configured so that estimating again the parameters for determining the position of the GNSS receiver or a change in the position of the GNSS receiver as well as the clock offset of the GNSS receiver makes use of ionospheric free code combination and ionospheric free carrier phase combination.

29. Apparatus of claim 27, further configured so that estimating again the parameters for determining the position of the GNSS receiver or a change in the position of the GNSS receiver as well as the clock offset of the GNSS receiver makes use of:
at least some of the obtained GNSS signals including at least one GNSS signal of the cycle-slip affected subset for which cycle slip fixing has been performed, but not including GNSS signals originating from a satellite having a clock offset or drift exceeding a threshold based on the specification for the satellite's atomic clock stability; and
the obtained precise satellite information.

30. Apparatus of claim 27, further configured so that estimating again the parameters for determining the position of the GNSS receiver or a change in the position of the GNSS receiver as well as the clock offset of the GNSS receiver makes use of:
at least some of the obtained GNSS signals including at least one GNSS signal of the cycle-slip affected subset for which cycle slip fixing has been performed, but not including GNSS signals originating from a satellite that has an abnormal clock offset in the sense that an attempt to compute the clock offset using the broadcast clock parameters results in a residual clock error, when compared to a clock offset computed using the precise satellite information, where said residual clock error exceeds a threshold; and
the obtained precise satellite information.

31. Rover comprising an apparatus according to claim 16.

32. Network station comprising an apparatus according to claim 16.

33. Computer program comprising computer-readable instructions configured, when executed on a computer, to cause the computer to carry out the method according to claim 1.

34. Computer program product including a computer program according to claim 33.

* * * * *